United States Patent
Astrakhantsev et al.

(10) Patent No.: US 10,984,082 B2
(45) Date of Patent: Apr. 20, 2021

(54) ELECTRONIC DEVICE AND METHOD FOR PROVIDING USER INFORMATION

(71) Applicant: Samsung Electronics Co., Ltd., Suwon-si (KR)

(72) Inventors: Andrii Astrakhantsev, Kharkov (UA); Oleksandr Shchur, Kyiv (UA); Mykhaylo Korobov, Kharkov (UA); Andriy Oliynyk, Kyiv (UA); Jae-hong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/778,818

(22) PCT Filed: May 30, 2016

(86) PCT No.: PCT/KR2016/005693
§ 371 (c)(1),
(2) Date: May 24, 2018

(87) PCT Pub. No.: WO2017/099314
PCT Pub. Date: Jun. 15, 2017

(65) Prior Publication Data
US 2018/0357400 A1 Dec. 13, 2018

(30) Foreign Application Priority Data

Dec. 9, 2015 (KR) .................. 10-2015-0175344

(51) Int. Cl.
*G06F 21/32* (2013.01)
*G06F 21/30* (2013.01)
(Continued)

(52) U.S. Cl.
CPC ............... *G06F 21/32* (2013.01); *G06F 3/01* (2013.01); *G06F 3/015* (2013.01);
(Continued)

(58) Field of Classification Search
CPC ...... G06F 21/32; G06F 3/015; G06F 3/04883; G06F 3/01; G06F 21/30; G06K 9/00288;
(Continued)

(56) References Cited

U.S. PATENT DOCUMENTS 8,744,522 B2    6/2014  Evanitsky
8,910,053 B2 *  12/2014 Arn .................. H04N 7/185
                                                715/744
(Continued)

FOREIGN PATENT DOCUMENTS

CN    104331654 A    2/2015
EP      2680190 A2   1/2014
(Continued)

OTHER PUBLICATIONS

Speeded up robust features, This page was last edited on Aug. 20, 2017 https://en.wikipedia.org/wiki/Speeded_up_robust_features.
(Continued)

*Primary Examiner* — Xuemei G Chen
(74) *Attorney, Agent, or Firm* — Jefferson IP Law, LLP

(57) ABSTRACT

Disclosed is an electronic device including a display configured to display an image, a sensing unit configured to sense biometric information of a user, and a controller configured to analyze the image to acquire image information and configured to provide user information based on the acquired image information and the sensed biometric information.

15 Claims, 20 Drawing Sheets

(51) Int. Cl.
*G06K 9/00* (2006.01)
*G06F 3/01* (2006.01)
*G06K 9/32* (2006.01)
*G06F 3/0488* (2013.01)
*G06K 9/20* (2006.01)

(52) U.S. Cl.
CPC .......... *G06F 3/04883* (2013.01); *G06F 21/30* (2013.01); *G06K 9/00* (2013.01); *G06K 9/00288* (2013.01); *G06K 9/00892* (2013.01); *G06K 9/00926* (2013.01); *G06K 9/2081* (2013.01); *G06K 9/32* (2013.01); *G06K 2009/00932* (2013.01); *G06K 2009/00939* (2013.01)

(58) Field of Classification Search
CPC ........... G06K 9/00892; G06K 9/00926; G06K 9/2081; G06K 2009/00932; G06K 2009/00939; G06K 9/00; G06K 9/32
See application file for complete search history.

(56) References Cited

U.S. PATENT DOCUMENTS

| | | | |
|---|---|---|---|
| 9,111,073 B1 | 8/2015 | Jiang et al. | |
| 9,262,612 B2* | 2/2016 | Cheyer | G06F 21/32 |
| 9,953,312 B2* | 4/2018 | Lee | G09G 5/12 |
| 10,387,739 B2* | 8/2019 | Han | G06F 21/32 |
| 2006/0282682 A1* | 12/2006 | Masaki | G06F 21/32 |
| | | | 713/186 |
| 2010/0317332 A1* | 12/2010 | Bathiche | H04N 21/4222 |
| | | | 455/418 |
| 2012/0027267 A1 | 2/2012 | Kim et al. | |
| 2012/0154108 A1* | 6/2012 | Sugaya | H04N 21/4126 |
| | | | 340/5.1 |
| 2013/0026220 A1 | 1/2013 | Whelihan | |
| 2013/0117025 A1* | 5/2013 | Park | G06K 9/00704 |
| | | | 704/260 |
| 2013/0227651 A1 | 8/2013 | Schultz et al. | |
| 2014/0058941 A1* | 2/2014 | Moon | H04W 12/0608 |
| | | | 705/42 |
| 2014/0118122 A1* | 5/2014 | Ryu | H04L 12/2814 |
| | | | 340/12.52 |
| 2014/0337634 A1 | 11/2014 | Starner et al. | |
| 2015/0026785 A1 | 1/2015 | Soon-Shiong | |
| 2015/0074786 A1* | 3/2015 | Hwang | H04L 63/0861 |
| | | | 726/9 |
| 2015/0187137 A1 | 7/2015 | Mullins | |
| 2015/0189179 A1* | 7/2015 | Eom | G06F 16/51 |
| | | | 348/231.2 |
| 2015/0261946 A1* | 9/2015 | Yoon | A61B 5/02438 |
| | | | 726/19 |
| 2015/0269389 A1* | 9/2015 | Lee | H04L 63/0435 |
| | | | 713/164 |
| 2015/0317516 A1* | 11/2015 | Tsoref | G06K 9/00335 |
| | | | 382/103 |
| 2015/0347812 A1* | 12/2015 | Lin | G06K 9/00033 |
| | | | 382/124 |
| 2016/0011767 A1* | 1/2016 | Jung | G06F 3/0488 |
| | | | 715/847 |
| 2016/0063230 A1* | 3/2016 | Alten | G06F 21/32 |
| 2017/0039357 A1* | 2/2017 | Hwang | G06F 21/32 |
| 2017/0188176 A1* | 6/2017 | Jang | G06F 3/04842 |
| 2017/0206398 A1* | 7/2017 | Kim | H04L 67/16 |
| 2017/0323146 A1* | 11/2017 | Zhang | G06F 21/32 |
| 2018/0137265 A1* | 5/2018 | Tokuyama | G06F 21/32 |

FOREIGN PATENT DOCUMENTS

| | | |
|---|---|---|
| KR | 10-1175174 B1 | 8/2012 |
| KR | 10-2014-0006487 A | 1/2014 |
| WO | 2015/072677 A1 | 5/2015 |
| WO | 2015-111805 A1 | 7/2015 |

OTHER PUBLICATIONS

Peter M. Roth, et al., Survey of Appearance-Based Methods for Object Recognition, Jan. 15, 2018.
Rupesh Kumar Rout, A Survey on Object Detection and Tracking Algorithms, Thesis, Jun. 2013.
Paul Viola et al., Rapid Object Detection using a Boosted Cascade of Simple Features, 2001.
Summed-area table, This page was last edited on Feb. 2, 2018 https://en.wikipedia.org/wiki/Summed_area_table.
Dilip K. Prasad, Survey of the Problem of Object Detection in Real Images, 2012.
Viola-Jones object detection framework, This page was last edited on May 21, 2018 https://en.wikipedia.org/wiki/Viola%E2%80%93Jones_object_detection_framework#cite_note-1.
K-means clustering, This page was last edited on Jul. 14, 2018 https://en.wikipedia.org/wiki/K-means_clustering.
K-d tree, This page was last edited on May 16, 2018 https://en.wikipedia.org/wiki/K-d_tree.
Random sample consensus, This page was last edited on Jul. 16, 2018 https://en.wikipedia.org/wiki/RANSAC.
Feature detection, This page was last edited on Nov. 4, 2017 https://en.wikipedia.org/wiki/Feature_detection_%28computer_vision%29.
Extended EP Search Report dated Nov. 6, 2018 issued in EP Patent Application No. 16873180.0.
Mayer et al.; Conversations with Connected Vehicles; 2015 5th International Conference on the Internet of Things (IoT); IEEE; XP032831118; Oct. 26, 2015.
European Search Report dated Sep. 23, 2019; European Appln. No. 16 873 180.0-1213.
European Search Report dated May 25, 2020, issued in European Application No. 16 873 180.0-1213.
European Search Report dated Feb. 24, 2021, issued in European Application No. 16873180.0.

* cited by examiner

FIG. 6

| IMAG INFORMATION | BIOMETRIC INFORMATION | USER INFORMATION |
|---|---|---|
| DOOR LOCK | FINGERPRINT 1 | PASSWORD: 19480 |
| GOOGLE | FINGERPRINT 2 | ID:Guest1<br>PW: abcde1 |
| STRONGBOX | FINGERPRINT 3 | PASSWORD: 120239 |
| AIR CONDITIONER | FINGERPRINT 4 | SET TEMPERATURE: 24℃ |
| USER A | FINGERPRINT 5 | ONE MILLION WON WAS BORROWED |

— 410

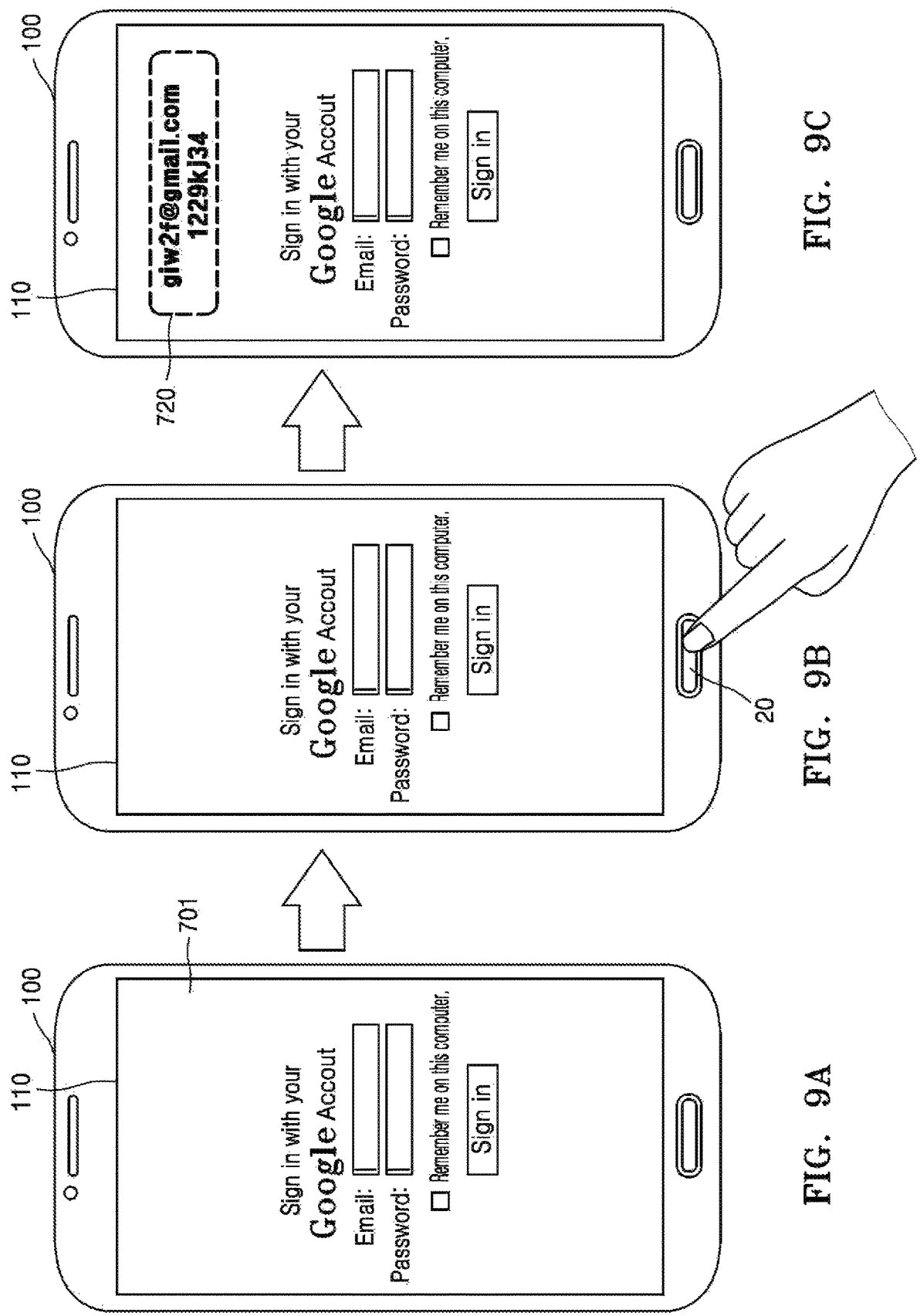

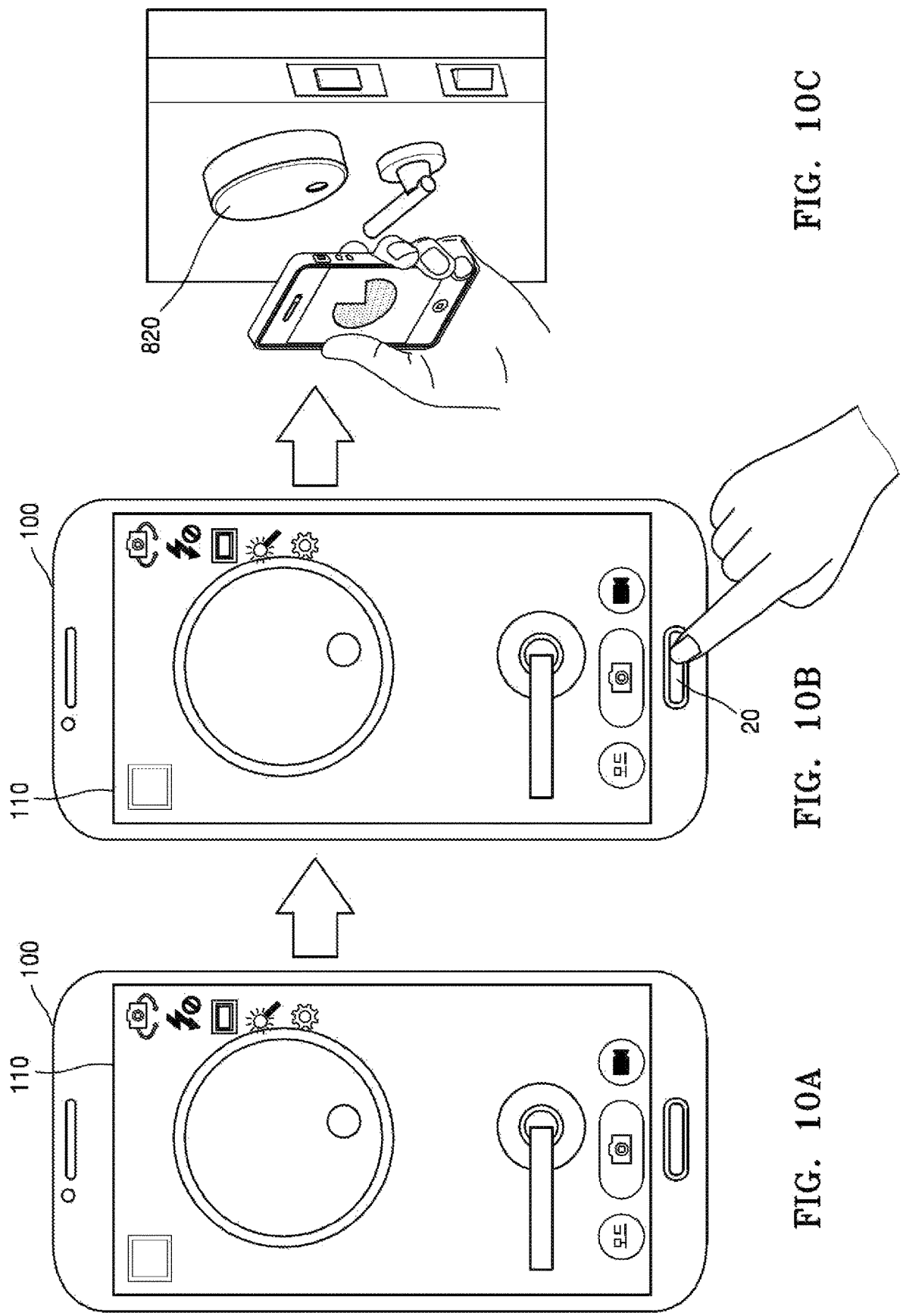

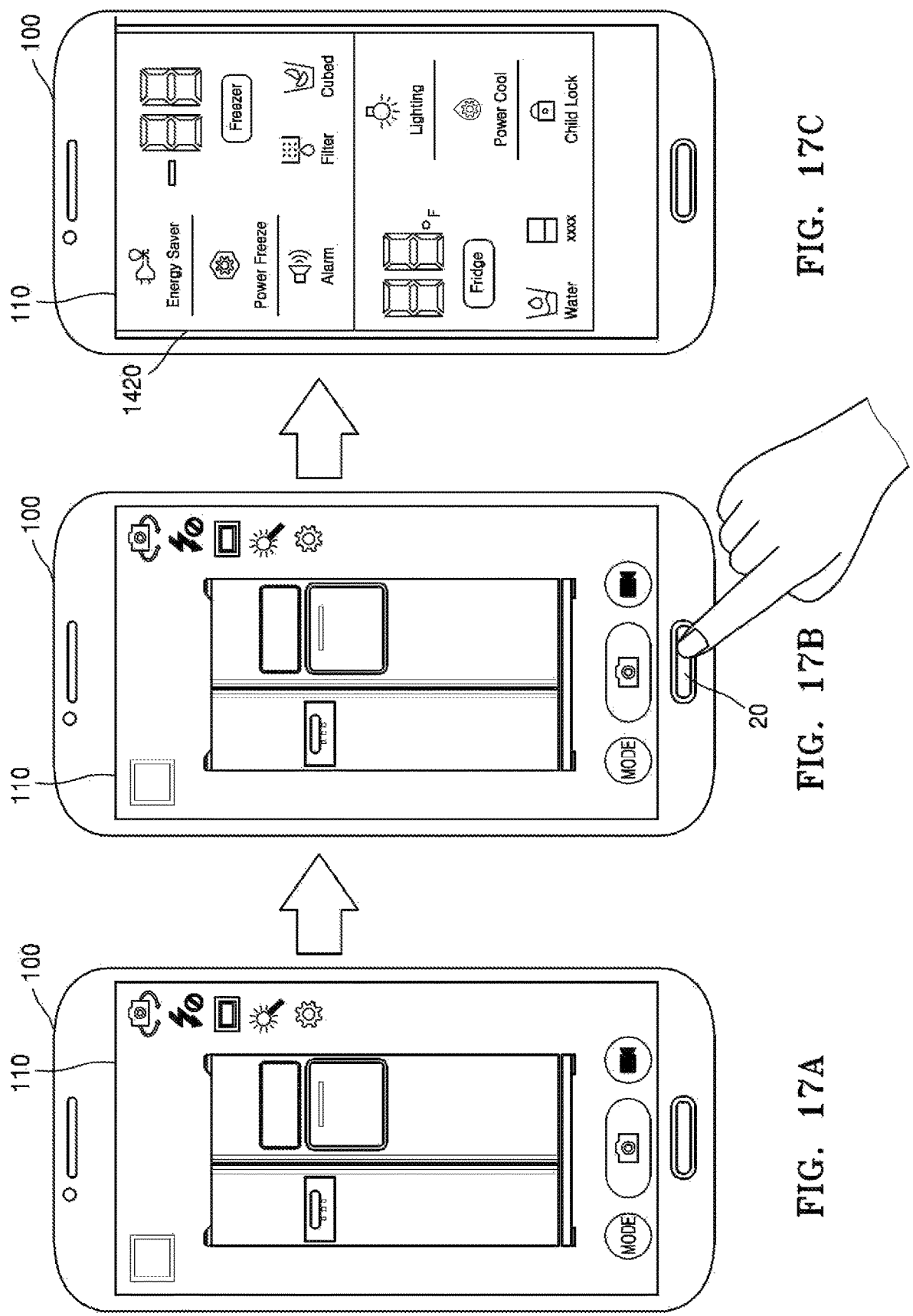

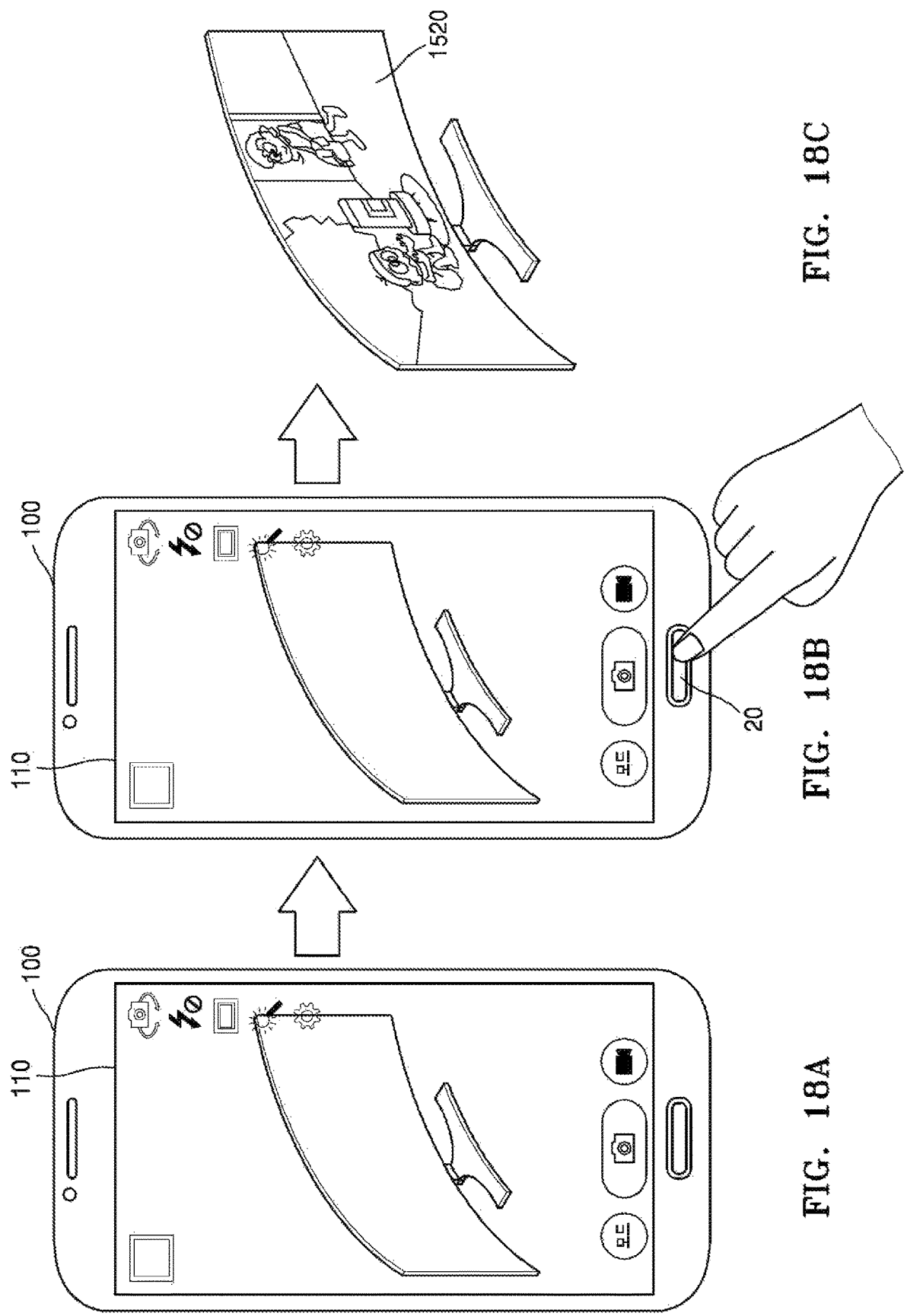

ELECTRONIC DEVICE AND METHOD FOR PROVIDING USER INFORMATION

TECHNICAL FIELD

The present disclosure relates to an electronic device and method for providing user information.

BACKGROUND ART

With the development of information communication technology and semiconductor technology, various types of electronic devices have been evolving into multimedia devices that provide various multimedia services. For example, electronic devices provide various multimedia services such as a messenger service, a broadcasting service, a wireless Internet service, a camera service, and a music playback service.

Recently, in order to protect the privacy of users' various types of information stored in electronic devices and prevent a third party from indiscriminately using the information, a fingerprint recognition function and a biometric authentication function are provided to the users. The biometric authentication function denotes a method of authenticating users using their biometric information.

In addition, an image recognition function is provided to electronic devices. The image recognition denotes a method of recognizing an image from a photograph, finding an object in the photograph, and automatically converting the object into searchable data.

DISCLOSURE

Technical Solution

Provided are an electronic device and method for recognizing an image to acquire image information and providing user information matching the acquired image information and the sensed biometric information.

Advantageous Effects

User information regarding a specific object may be readily provided by photographing the specific object, without memorizing or learning the user information regarding the specific object piece by piece.

In addition, information regarding a specific object may be intuitively searched for by photographing the specific object.

Furthermore, a specific object may be readily controlled by photographing the specific object.

DESCRIPTION OF DRAWINGS

FIG. 6 is a diagram showing an example in which an electronic device stores user information mapped to the image information and biometric information according to an embodiment;

FIGS. 9A to 9C are diagrams showing an example in which an electronic device displays user information on a display according to an embodiment;

FIGS. 10A to 10C are diagrams showing an example in which an electronic device transmits user information to an external device according to an embodiment;

FIGS. 17A to 17C are diagrams showing an example in which an electronic device controls an external device using a user's settings information according to an embodiment;

FIGS. 18A to 18C are diagrams showing an example in which an electronic device transmits user information to an external device or controls an external device using the user information according to an embodiment;

BEST MODE

Figure 1:
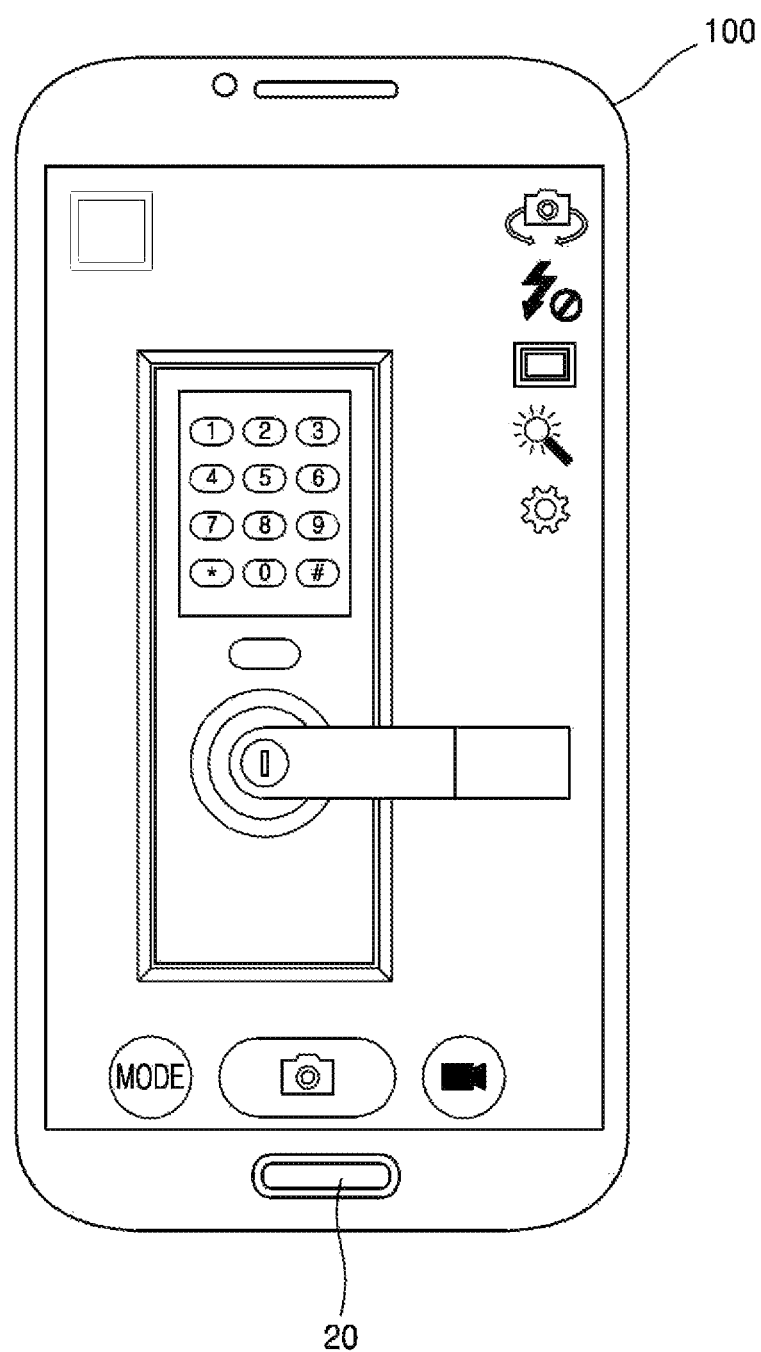
FIG. 1 is a diagram showing an electronic device according to an embodiment.

According to an aspect of an embodiment, a method of providing user information in an electronic device includes displaying an image, acquiring image information by analyzing the image, sensing biometric information, and providing user information based on the acquired image information and the sensed biometric information.

The method may further include photographing at least one object to acquire the image.

The method may further include storing the user information matching the image and the biometric information.

The acquiring of the image information may include recognizing at least one object included in the image to acquire the recognized object information as the image information.

The sensing of the biometric information may include sensing at least one of fingerprint information, iris information, voice information, vein information, face information, palmprint information, electroencephalogram (EEG) information, and electrocardiogram (ECG) information of the user.

The acquiring of the image information may include receiving a touch input for selecting a specific region from the image and analyzing the selected specific region to acquire the image information, and the sensing of the biometric information may include sensing user fingerprint information from the touch input.

The method may further include receiving user identification information including at least one of an identity (ID)/password (PW), a lock pattern, and a personal identification number (PIN). The providing of the user information includes providing the user information based on the image information, the biometric information, and the user identification information.

The user information may include at least one of a user ID, a user password, a secret memo, a secret diary, settings information, and control information.

The providing of the user information may include displaying the user information matching the image information and the biometric information on the display.

The acquiring of the image information may include recognizing an object included in the image, and the providing of the user information may include transmitting key information for unlocking the object to the object, the key information matching the object and the biometric information.

The object may be a door lock.

The acquiring of the image information may include recognizing an external device included in the image, and the providing of the user information may include controlling the external device using the user information matching the external device and the biometric information.

The external device may be an image display device, and the providing of the user information may include controlling an image displayed on the image display device based on user age information included in the user information.

According to an aspect of another embodiment, an electronic device includes a display configured to display an image; a sensing unit configured to sense biometric information of a user; and a controller configured to analyze the image to acquire image information and configured to provide user information based on the acquired image information and the sensed biometric information.

The electronic device may further include a camera configured to photograph at least one object to acquire the image.

The electronic device may further include a storage configured to store the user information matching the image and the biometric information.

The controller may recognize at least one object included in the image to acquire the recognized object information as the image information.

The biometric information may include at least one of fingerprint information, iris information, voice information, vein information, face information, palmprint information, electroencephalogram (EEG) information, and electrocardiogram (ECG) information of the user, and the sensing unit may include at least one of a fingerprint recognition sensor, an iris recognition sensor, a voice recognition sensor, a vein recognition sensor, a face recognition sensor, a palmprint recognition sensor, an EEG measurement sensor, and an ECG measurement sensor.

The display may include a touch screen and the sensing unit, the touch screen may receive a touch input for selecting a specific region from the image, the sensing unit may sense user fingerprint information from the touch input, and the controller may analyze the selected specific region to acquire the image information.

The electronic device may further include a user input unit configured to receive user identification information including at least one of an identity (ID)/password (PW), a lock pattern, and a personal identification number (PIN). The controller may provide the user information based on the image information, the biometric information, and the user identification information.

The user information may include at least one of a user ID, a user password, a secret memo, a secret diary, settings information, and control information.

The controller may perform control such that the user information matching the image information and the biometric information is displayed on the display.

The controller may recognize an object included in the image, and may perform control such that key information for unlocking the object is transmitted to the object, the key information matching the object and the biometric information.

The controller may recognize an external device included in the image, and may control the external device using the user information matching the external device and the biometric information.

The external electronic device may be an image display device, and the controller may control an image displayed on the image display device based on user age information included in the user information.

MODE FOR INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Terms used herein will be briefly described, and the embodiments will be described in detail.

Terms used in the embodiments have been selected as general terms which are widely used at present, in consideration of the functions of the embodiments, but may be altered according to the intent of an operator skilled in the art, conventional practice, or introduction of new technology. Also, if there is a term which is arbitrarily selected by the applicant in a specific case, in this case, a meaning of the term will be described in detail in a corresponding description portion of the embodiments. Therefore, the terms used herein should be defined on the basis of the entire content of the embodiments instead of a simple name of each of the terms.

Furthermore, when one part is referred to as "comprising (or including or having)" other elements, it should be understood that it can comprise (or include or have) only those elements, or other elements as well as those elements if there is no specific limitation. Moreover, each of terms such as "unit" and "module" used herein denotes an element for performing at least one function or operation, and may be implemented in hardware, software or a combination of hardware and software.

Hereinafter, embodiments will be fully described with reference to the accompanying drawings in such a way that those skilled in the art can easily carry out the embodiments. The embodiments may, however, be embodied in many different forms and should not be construed as being limited to the embodiments set forth herein. In the accompanying drawings, portions irrelevant to a description of the embodiments will be omitted for clarity. Moreover, like reference numerals refer to like elements throughout.

FIG. 1 is a diagram showing an electronic device according to an embodiment.

Hereinafter, the electronic device 100 denotes an electronic device that uses a motion of an electron. The electronic device 100 according to an embodiment may be implemented in various forms. For example, the electronic device 100 may be implemented as one of various electronic devices such as a cell phone, a smartphone, a laptop computer, a desktop computer, a tablet PC, an e-book terminal, a digital broadcasting terminal, a personal digital assistant (PDA), a portable multimedia player (PMP), a navigation device, an MP3 player, a digital camera, a camcorder, an Internet protocol television (IPTV), a digital television (DTV), a wearable device (e.g., a smart watch, a smart glass, etc.), or an accessory. However, embodiments of the present disclosure are not limited thereto.

The term "user" used herein denotes a person who controls a function or operation of the electronic device 100, and may include a viewer, a manager, or an installation engineer.

The electronic device 100 according to an embodiment may display an image. The image may include an image photographed using the electronic device 100, an image stored in the electronic device 100, or an image received from an external device.

In addition, the electronic device 100 may analyze the displayed image to acquire image information. The image information may include information obtained by recognizing a person or a thing included in the image and expressing the person or object as a text word.

For example, as shown in FIG. 1, when an image including a door lock is displayed, the electronic device 100 according to an embodiment may recognize an object included in the image as being a door lock using an object recognition method. When the door lock is recognized, the electronic device 100 may acquire image information "door lock."

According to some embodiments, the electronic device 100 may include a touch screen 155. In order to acquire image information from an image displayed on the touch screen 155, the electronic device 100 may receive a touch input of a user that selects a specific region from the image displayed on the touch screen 155. In this case, the operation of selecting a specific region from the image denotes an operation of selecting at least one object such as a thing or a person from the image. In addition, when a plurality of objects are displayed in the displayed image (e.g., the display image includes a door lock and a refrigerator), the electronic device 100 may receive a user input for selecting any one of the plurality of objects. The electronic device 100 may recognize the selected object to acquire image information. Alternatively, the electronic device may receive a user input for selecting two or more of the plurality of objects. The electronic device 100 may recognize the selected two or more objects to acquire image information.

Hereinafter, the biometric information denotes unique information of a living thing for identifying an individual, and may include unique action information (e.g., a gesture, a gait, a posture, etc.) of a user in addition to information such as a fingerprint, an iris, a finger vein, a vein, a cornea, a face, a voice pattern (voice or volume), an electroencephalogram (EEG), and an electrocardiogram (ECG). Embodiments of the present disclosure are not limited thereto.

The electronic device 100 according to an embodiment may include various sensors for measuring the biometric information of the user. For example, the electronic device 100 according to an embodiment may include a fingerprint recognition sensor, an iris recognition sensor, a voice recognition sensor, a vein recognition sensor, a face recognition sensor, a palmprint recognition sensor, etc. Alternatively, the electronic device 100 may include an EEG measurement sensor, an ECG measurement sensor, etc. However, embodiments of the present disclosure are not limited thereto.

For example, as shown in FIG. 1, the electronic device 100 may include a fingerprint recognition region 20. When the fingerprint recognition region 20 is touched with a finger of the user (e.g., when the user brings his/her finger into contact with the fingerprint recognition region 20), the electronic device 100 may authenticate the user by recognizing a fingerprint of the user using the fingerprint recognition sensor. The fingerprint recognition region 20 according to an embodiment may be implemented on a touch screen. The electronic device 100 may receive an input of a user touching the touch screen, and at the same time may sense fingerprint information of the user through the touch input. Hereinafter, the fingerprint information denotes a fingerprint image indicating a unique characteristic for each person or information indicating characteristics of a fingerprint such as fingerprint minutiae acquired from the fingerprint image. Hereinafter, the touch input denotes an action of touching with a hand to send a signal. As an example, a method of acquiring the touch input may include a real touch and a proximity touch, but is not limited thereto.

In addition, the electronic device 100 may photograph an iris of a user using a camera, and may authenticate the user using a pattern of the photographed iris. In addition, the electronic device 100 may recognize unique action information (e.g., a gesture, a gait, a posture, etc.) of the user in addition to information such as a fingerprint, an iris, a finger vein, a vein, a cornea, a face, a voice pattern (voice or volume), an electroencephalogram (EEG), and an electrocardiogram (ECG) of the user to authenticate the user.

In addition, the electronic device 100 may sense a plurality of pieces of biometric information to authenticate the user. In this case, the electronic device may sense the same type of biometric information several times or may sense different types of biometric information. For example, the electronic device 100 may sense thumb fingerprint information and index finger fingerprint information of the user to authenticate the user. Alternatively, the electronic device 100 may sense fingerprint information and iris information of the user to authenticate the user.

Alternatively, the electronic device 100 may use authentication information, instead of the biometric information, to authenticate the user. For example, the electronic device 100 may use a password, a screen lock pattern, a personal identification number (PIN), etc. to authenticate the user.

The electronic device 100 according to an embodiment may provide the user information on the basis of the acquired image information and the sensed biometric information. The user information according to an embodiment is information regarding the user, and may include information associated with the user's privacy, such as an identity (ID) of the user, a password (a door lock password, an account password, a login password, etc.) of the user, credit card information of the user, and a secret memo or secret diary written by the user, the user's settings information, device control information, etc. However, embodiments of the present disclosure are not limited thereto.

The electronic device 100 according to an embodiment may provide different user information depending on the types or number of pieces of the sensed biometric information. For example, a case in which the iris information of the user is sensed and a case in which the fingerprint information of the user is sensed may have different ranges of the user information. In addition, a case in which one piece of the fingerprint information of the user is sensed and a case in which two pieces of the fingerprint information of the user are sensed may have different ranges of the user information. However, embodiments of the present disclosure are not limited thereto.

Figure 2:
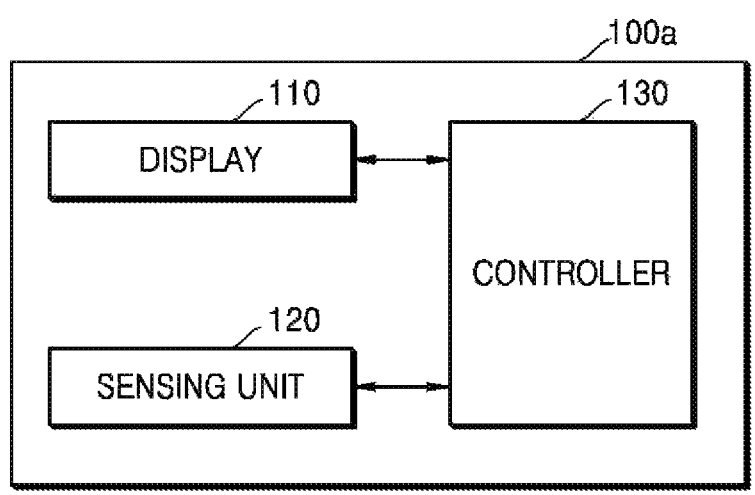
FIG. 2 is a block diagram showing a configuration of an electronic device according to an embodiment.

FIG. 2 is a block diagram showing a configuration of an electronic device according to an embodiment.

Referring to FIG. 2, an electronic device 100a according to an embodiment may include a display 110, a sensing unit 120, and a controller 130.

The display 110 converts an image signal, a data signal, an on-screen display (OSD) signal, a control signal or the like, which is processed by the controller 130, into a driving signal. Here, the display 110 may be implemented as a liquid crystal display, a thin film transistor-liquid crystal display, an organic light-emitting diode, a flexible display, or the like. In addition, the display 110 may be implemented as a three-dimensional (3D) display. In addition, the display 110 may be configured as a touch screen and thus may be used as an input device as well as an output device.

The display 110 according to an embodiment may display an image. In this case, the image displayed on the display 110 may include at least one of an image photographed by the electronic device 100, an image stored in the electronic device 100, or an image received from an external device. However, embodiments of the present disclosure are not limited thereto.

The sensing unit 120 according to an embodiment may sense biometric information of a user and may deliver the sensed biometric information to the controller 130. The sensing unit 120 may include a sensor that senses the biometric information of the user. For example, the sensing unit 120 may include a fingerprint recognition sensor, an iris recognition sensor, a voice recognition sensor, a vein recognition sensor, a face recognition sensor, a palmprint recognition sensor, an EEG measurement sensor, an ECG measurement sensor, etc. However, embodiments of the present disclosure are not limited thereto.

The controller 130 controls the overall operation of the electronic device 100. For example, the controller 130 may control the electronic device 100 using an internal program.

The controller 130 according to an embodiment may analyze the image to acquire image information. For example, the controller 130 may recognize at least one object included in the image using an object recognition method and may acquire information regarding the recognized object as the image information. This will be described below in detail with reference to FIG. 4.

In addition, the controller 130 may provide user information on the basis of the acquired image information and the sensed biometric information. For example, the controller 130 may perform control to display user information matching the image information and the biometric information on the display 110 or may perform control to transmit the user information to an external device. In addition, the controller 130 may control the external device using the user information.

Figure 3:
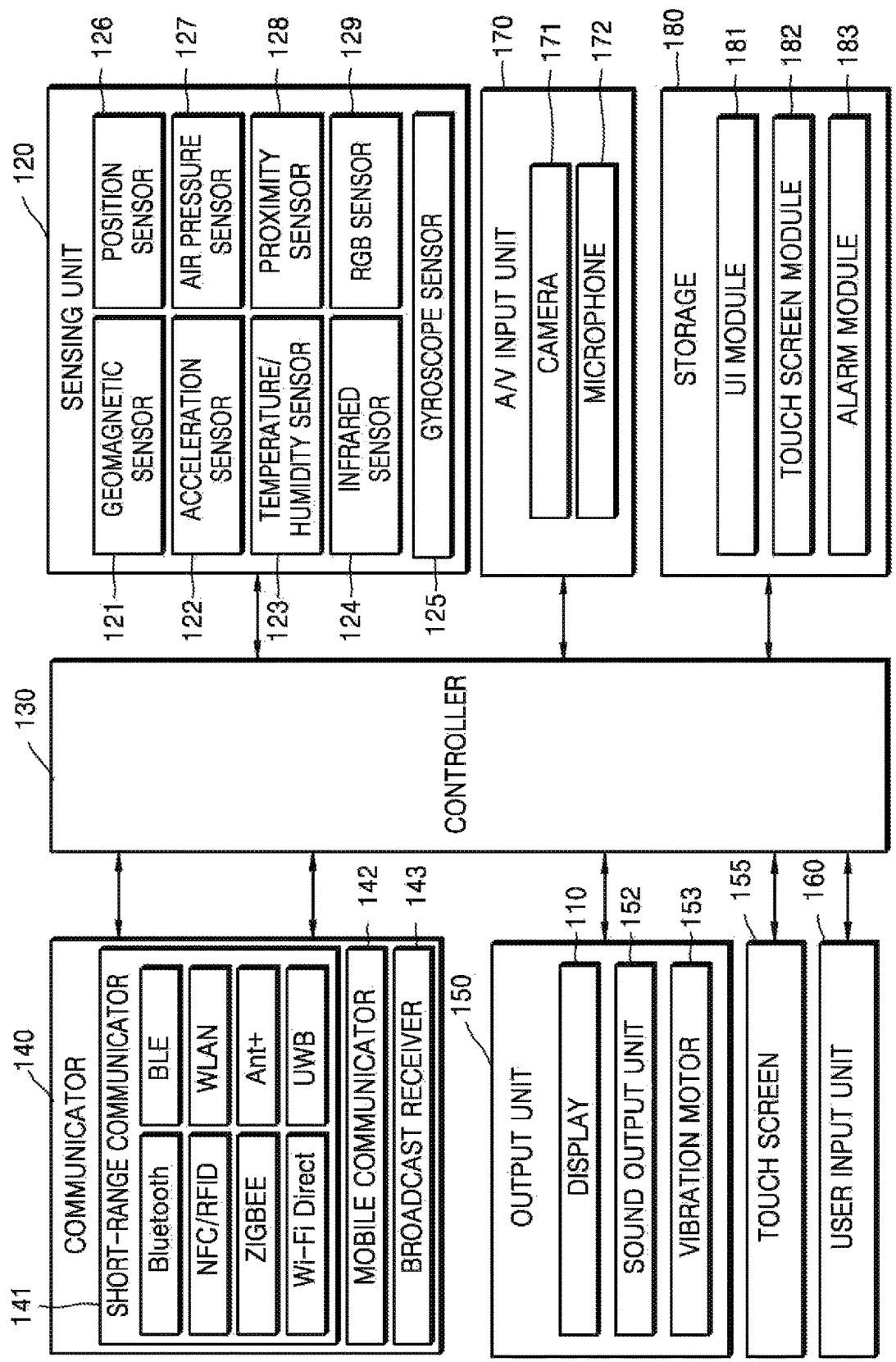
FIG. 3 is a block diagram showing a configuration of an electronic device according to an embodiment.

FIG. 3 is a block diagram showing a configuration of an electronic device according to an embodiment.

Referring to FIG. 3, an electronic device 100b may be an example of the electronic device 100 of FIG. 1.

Referring to FIG. 3, the electronic device 100b according to an embodiment may further include a communicator 140, an output unit 150, a user input unit 160, an audio/video (A/V) input unit 170, and a storage 180 in addition to a controller 130, a display 110, and a sensing unit 120.

In the description of FIG. 3, repetitive description on the controller 130, the display 110, and the sensing unit 120 described in FIG. 2 will be omitted.

The communicator 140 may include one or more elements for communicating between the electronic device 100 and an external deice (e.g., a server). For example, the communicator 140 may include a short-range wireless communicator 141, a mobile communicator 142, and a broadcast receiver 143.

The short-range wireless communicator 141 may include, but is not limited to, a Bluetooth communicator, a near field communicator, a wireless LAN (WLAN) communicator, a Zigbee communicator, an Infrared Data Association (IrDA) communicator, a Wi-Fi Direct (WFD) communicator, an ultra wideband (UWB) communicator, and an Ant+ communicator.

The mobile communicator 142 transmits and receives a radio signal to and from at least one of a base station, an external terminal, and a server over a mobile communication network. Here, the radio signal may include a voice call signal, a video call signal, or various types of data according to transmission and/or reception of text and/or multimedia messages.

The broadcast receiver 143 receives a broadcast signal and/or broadcast-related information from the outside over a broadcast channel The broadcast channel may include a satellite channel and a terrestrial channel Depending on the implementation, the electronic device 100 may not include the broadcast receiver 143.

The communicator 140 may receive an image from the external device. Furthermore, the communicator 140 may transmit an image displayed on the display 110 and an image analysis request to the external server. In addition, the communicator 140 may analyze the transmitted image to receive acquired image information from the external server.

The output unit 150 may output an audio signal, a video signal, or a vibration signal, and may include the display 110, a sound output unit 152, and a vibration motor 153. The display 110 was already described with reference to FIG. 2, and thus the detailed description of the display 110 will be omitted.

The sound output unit 152 outputs audio data received from the communicator 140 or stored in the storage 180. In addition, the sound output unit 152 may output a sound signal (e.g., a call signal reception sound, a message reception sound, or an alarm sound) associated with a function performed by the electronic device 100. The sound output unit 152 may include a speaker, a buzzer, etc.

The vibration motor 153 may output a vibration signal. For example, the vibration motor 153 may output a vibration signal corresponding to an output of audio data or video data. In addition, the vibration motor 153 may output the vibration signal when a touch is input to the touch screen.

The controller 130 controls the overall operation of the electronic device 100. For example, the controller 130 may control the communicator 140, the output unit 150, the user input unit 160, the sensing unit 120, and the A/V input unit 170, and so on by executing programs stored in the storage 180.

The user input unit 160 denotes a unit for a user inputting data for controlling the electronic device 100. For example, examples of the user input unit 160 may include, but are not limited to, a key pad, a dome switch, a touch pad (a contact capacitance type, a pressure resistance type, an infrared sensing type, a surface ultrasonic wave conduction type, an integral tension measurement type, a piezoelectric effect type, etc.), a jog wheel, a jog switch, etc.

The touch screen 155 may be composed of a touch panel and a display panel. The touch screen 155 may be configured to detect a touch pressure in addition to a touch input position and a touched area. In addition, the touch screen 155 may be configured to detect a proximity touch in addition to a real touch.

The term "real touch" used herein denotes a case in which a screen is actually touched with a touch tool (e.g., an electronic pen, a finger, etc.), and the term "proximity touch" used herein denotes a case in which a screen is not actually touched with a touch tool, but approached within a predetermined distance from the screen. Although not shown, various sensors may be provided inside or in the vicinity of the touch screen 155 in order to sense a touch or a proximity touch of the touch screen 155.

An example of the sensor for sensing the touch of the touch screen 155 includes a tactile sensor. The tactile sensor denotes a sensor that senses a touch by a specific object to a degree that a human can feel or more. The tactile sensor may sense various pieces of information such as a roughness of a touched surface, a stiffness of a touched object, a temperature of a touched point, etc.

Moreover, an example of the sensor for sensing the touch of the touch screen 155 includes a proximity sensor 128. The proximity sensor 128 denotes a sensor that uses an electromagnetic force or infrared light to detect an object approaching a predetermined detection surface or an object near the detection surface without any mechanical contact. Examples of the proximity sensor include a transmissive photoelectric sensor, a direct reflective photoelectric sensor, a mirror reflective photoelectric sensor, a high-frequency oscillation proximity sensor, a capacitive proximity sensor, a magnetic proximity sensor, and an infrared proximity sensor. Examples of a user's touch gesture may include a tap, a touch and hold, a double tap, a drag, panning, a flick, a drag and drop, and a swipe.

Furthermore, the touch screen 155 may include a fingerprint recognition sensor. When the touch screen 155 includes the fingerprint recognition sensor, the touch screen 155 may receive an input of a user touching the touch screen, and at the same time, may sense fingerprint information of the user through the touch input.

The sensing unit 120 may include a sensor that senses a state of the electronic device 100 or a nearby state of the electronic device 100 in addition to a sensor that senses biometric information. In addition, the sensing unit 120 may deliver information sensed by the sensor to the controller 130.

The sensing unit 120 may include, but is not limited to, at least one of a magnetic sensor, an acceleration sensor, a temperature/humidity sensor, an infrared sensor, a gyroscope sensor, a positioning sensor (e.g., a Global Positioning System (GPS) sensor), an air pressure sensor, a proximity sensor, and an RGB sensor (illumination sensor), in addition to the fingerprint recognition sensor, the iris recognition sensor, the voice recognition sensor, the vein recognition sensor, the face recognition sensor, and the palmprint recognition sensor described with reference to FIG. 2. A function for each sensor may be directly inferred from its name by those skilled in the art, and thus its detailed description will be omitted.

The sensing unit 120 may sense the movement of the electronic device 100, a biometric signal of a user of the electronic device 100, a touch signal input to the electronic device 100, etc.

The A/V input unit 170 is intended to input an audio signal or video signal, and may include a camera 171 and a microphone 172. The camera 171 may obtain an image frame of a still image or moving image through an image sensor in a video call mode or in a photographing mode. The image captured through the image sensor may be processed through the controller 130 or a separate image processor (not shown).

The image frame processed by the camera 171 may be stored in the storage 180 or transmitted to the outside via the communicator 140. Two or more cameras 171 may be provided according to a configuration aspect of the electronic device 100.

The microphone 172 receives an external sound signal and processes the received external sound signal into electrical voice data. For example, the microphone 172 may receive a sound signal from an external device or a talker. The microphone 172 may use various noise removal algorithms to remove noise generated while the external sound signal is received.

The storage 180 may store a program for processing and controlling the controller 130 and may also store input/output data (e.g., an application, content, time zone information of an external device, contacts).

The storage 180 may include at least one type of a flash memory type, hard disk type, multimedia card micro type, or card type memory (e.g., an SD or XD memory), storage medium among a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc. In addition, the electronic device 100 may operate a web storage device or a cloud server that performs a storage function of the storage 180 over the Internet.

Programs stored in the storage 180 may be classified into a plurality of modules according to the functions of the programs and, for example, may be classified into a user interface (UI) module 181, a touch screen module 182, an alarm module 183, and so on.

The storage 180 according to an embodiment may store user information mapped to image information and biometric information. The user information according to an embodiment is information regarding the user, and may include information associated with the user's privacy, such as an identity (ID) of the user, a password (a door lock password, an account password, a login password, etc.) of the user, credit card information of the user, and a secret memo or secret diary written by the user, the user's settings information, device control information, etc. However, embodiments of the present disclosure are not limited thereto. In addition, the storage 180 may store the image information, the biometric information, and the user information in the form of a table. This will be described in detail below with reference to FIG. 6.

The UI module 181 may provide a specialized UI, GUI, or the like, which is linked with the electronic device 100, for each application. The touch screen module 182 may sense a touch gesture of a user on a touch screen and deliver information regarding the touch gesture to the controller 130.

The touch screen module 182 may recognize and analyze a touch code. The touch screen module 182 may also be configured as separate hardware including a controller.

The alarm module 183 may generate a signal for informing of the occurrence of an event in the electronic device 100. Examples of the event occurring in the electronic device 100 may include a call signal reception, a message reception, a key signal input, and an event reminder. The alarm module 183 may also output an alarm signal in the form of a video signal through the display 110, output an alarm signal in the form of an audio signal through the sound output unit 152, and output an alarm signal in the form of a vibration signal through the vibration motor 153.

Figure 4:
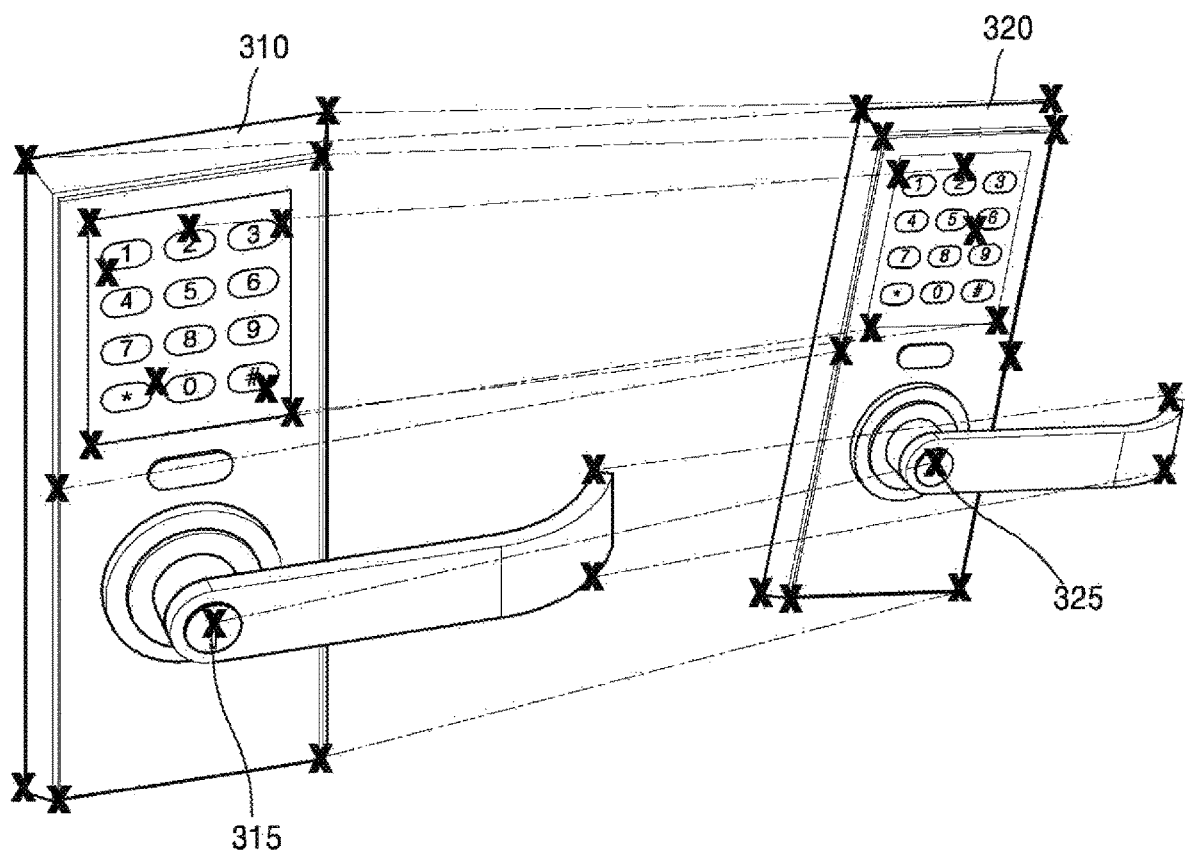
FIG. 4 is a diagram showing an example in which an electronic device recognizes an object from an image and acquires image information according to an embodiment.

FIG. 4 is a diagram showing an example in which an electronic device recognizes an object from an image and acquires image information according to an embodiment.

Referring to FIG. 4, an electronic device 100 according to an embodiment may perform image processing on an image. The image processing may include Gaussian filtering, image blurring, etc. Additionally, the electronic device 100 may perform various processing processes.

The electronic device 100 may extract a feature point from the processed image. The image feature point (interesting point) is a point that may indicate a feature of the image, and denotes a point or a set of points that describe the feature of the image well, irrespective of a change, such as scaling, rotation, and distortion, etc., in the image.

For example, the image feature point may be a readily identifiable point that is distinct from an ambient environment. In addition, a point that may be identified even when the shape, size, or position of an object is changed and may be readily found from the image even when a view point or illumination of a camera is changed may be extracted as the image feature point. For example, the electronic device 100 may extract a corner point from the image as the image feature point. Here, a Harris corner detection method, Shi-Tomasi feature point extraction method, a feature point detection method using Scale Invariant Feature Transform (SIFT), or a Features from Accelerated Segment Test (FAST) method may be used to extract the image feature point. The above-described methods are algorithms known to those skilled in the art, and their detailed description will be omitted.

For example, as shown in FIG. 4, the electronic device 100 may extract a feature point 315 from a first image 310. Here, the first image 310 may include an image photographed by the electronic device 100, an image received from an external device, an image stored in the electronic device 100, etc.

The electronic device 100 may compare the extracted feature point 315 with feature points of candidate images to extract a second image 320 mapped to the first image 310 from among the candidate images. For example, the electronic device 100 may generate an image feature point model using the extracted image feature point, and may compare the generated image feature point model with feature point models of the candidate images stored in the electronic device 100 to extract the second image 320 corresponding to the first image 310. The electronic device 100 may extract the second image 320 having a feature point matching the extracted feature point from the first image 310.

The electronic device 100 may acquire image information of the first image 310 on the basis of the extracted second image 320. For example, when the first image 310 matches the second image 320 having image information "door lock," the electronic device 100 may determine the image information of the first image 310 as "door lock."

In addition, the electronic device 100 may acquire the image information using a human recognition method. For example, the image information may be acquired on the basis of features, such as a face, an expression, a body, a behavior, a gesture, and a movement, that may be extracted from a person included in the image.

Figure 5:
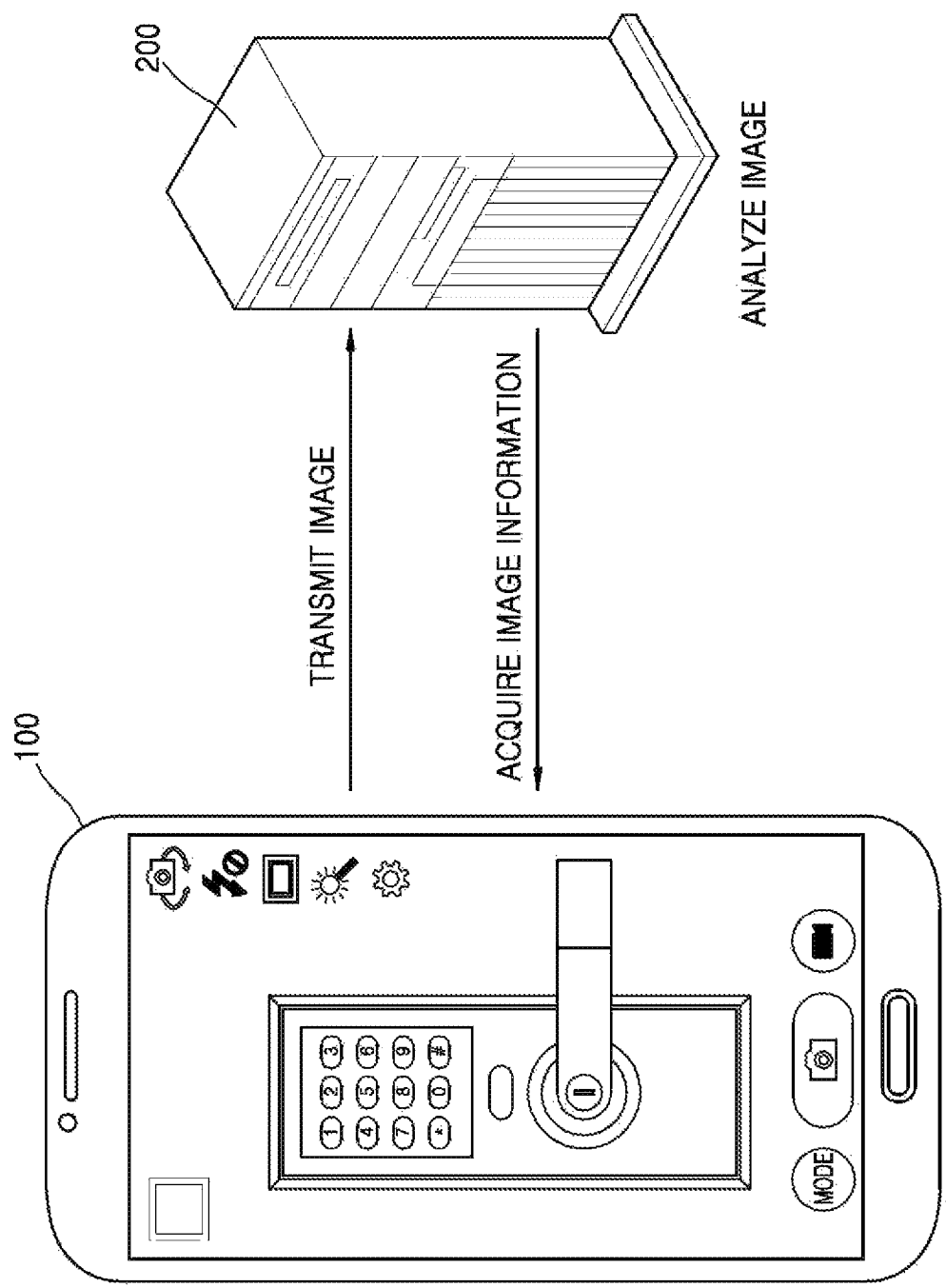
FIG. 5 is a diagram showing an example in which an electronic device acquires image information from an external server according to an embodiment.

FIG. 5 is a diagram showing an example in which an electronic device acquires image information from an external server according to an embodiment.

Referring to FIG. 5, the electronic device 100 may transmit an image desired to be analyzed (hereinafter referred to as a first image) and a request to analyze the image to an external server 200. The server 200 may receive a first image and analyze the received first image. The server 200 may acquire image information of the first image (i.e., information regarding an object included in the image) using an object recognition method. Here, the server 200 may extract a second image matching the first image, using the object recognition method described in FIG. 4.

The server 200 may acquire the image information of the first image on the basis of the extracted second image. For example, when the first image matches the second image having image information "door lock," the server 200 may determine the image information of the first image as "door lock." The server 200 may transmit the image information of the first image to the electronic device 100. The electronic device 100 may acquire the image information of the first image from the server 200.

FIG. 6 is a diagram showing an example in which an electronic device stores user information mapped to image information and biometric information according to an embodiment.

Referring to FIG. 6, the electronic device 100 may store a mapping table 410 in the storage. The mapping table 410 according to an embodiment may include image information, biometric information, and user information. The mapping table 410 may be a table of mapping the image information, the biometric information, and the user information to one another. The electronic device 100 may provide the user information according to the mapping table.

For example, when the image information acquired from the image is "door lock," and the sensed biometric information (e.g., a fingerprint) is fingerprint 1 (e.g., a fingerprint of a first user), the electronic device 100 may provide user information "password: 19480."

Alternatively, when the image information acquired from the image is "air conditioner," and the sensed biometric information is fingerprint 4, the electronic device 100 may control an air conditioner using user information corresponding to "air conditioner" and "fingerprint 4." For example, the electronic device 100 may transmit a control command for setting a temperature of the air conditioner to 24° C.

Alternatively, when "user A" is recognized from the image, and the sensed biometric information is fingerprint 5, the electronic device 100 may provide a secret memo that was written for user A (one million won was borrowed).

An example in which the image information, the biometric information, and the user information are stored in the form of a mapping table is shown in and described with reference to FIG. 6, but is not limited thereto. The electronic device 100 may store the image information, the biometric information, and the user information in various forms.

The electronic device 100 according to an embodiment may store the user information corresponding to a specific object included in the image. For example, the electronic device 100 may receive an input (e.g., a touch & hold, a double-touch, a drag input, etc.) of selecting the specific object from the image. Here, the image may include an image prestored in a gallery application or a preview image photographed and displayed on the display.

When the specific object is selected, the electronic device 100 may receive user information corresponding to the selected specific object. The user information may include information associated with the user's privacy, such as an identity (ID) of the user, a password (a door lock password, an account password, a login password, etc.) of the user, credit card information of the user, and a secret memo or secret diary written by the user, multimedia information, the user's settings information, device control information, etc.

In addition, the electronic device 100 may receive biometric information of the user matching the selected specific object and the received user information. Here, the biometric information may include at least one of fingerprint information, iris information, voice information, vein information, face information, palmprint information, electroencephalogram (EEG) information, electrocardiogram (ECG) information, and unique action information (e.g., a gesture, a gait, a posture, etc.) of the user.

The electronic device 100 may store the selected specific object, the received user information, and the biometric information of the user corresponding to one another.

Figures 7A, 7B, 7C:
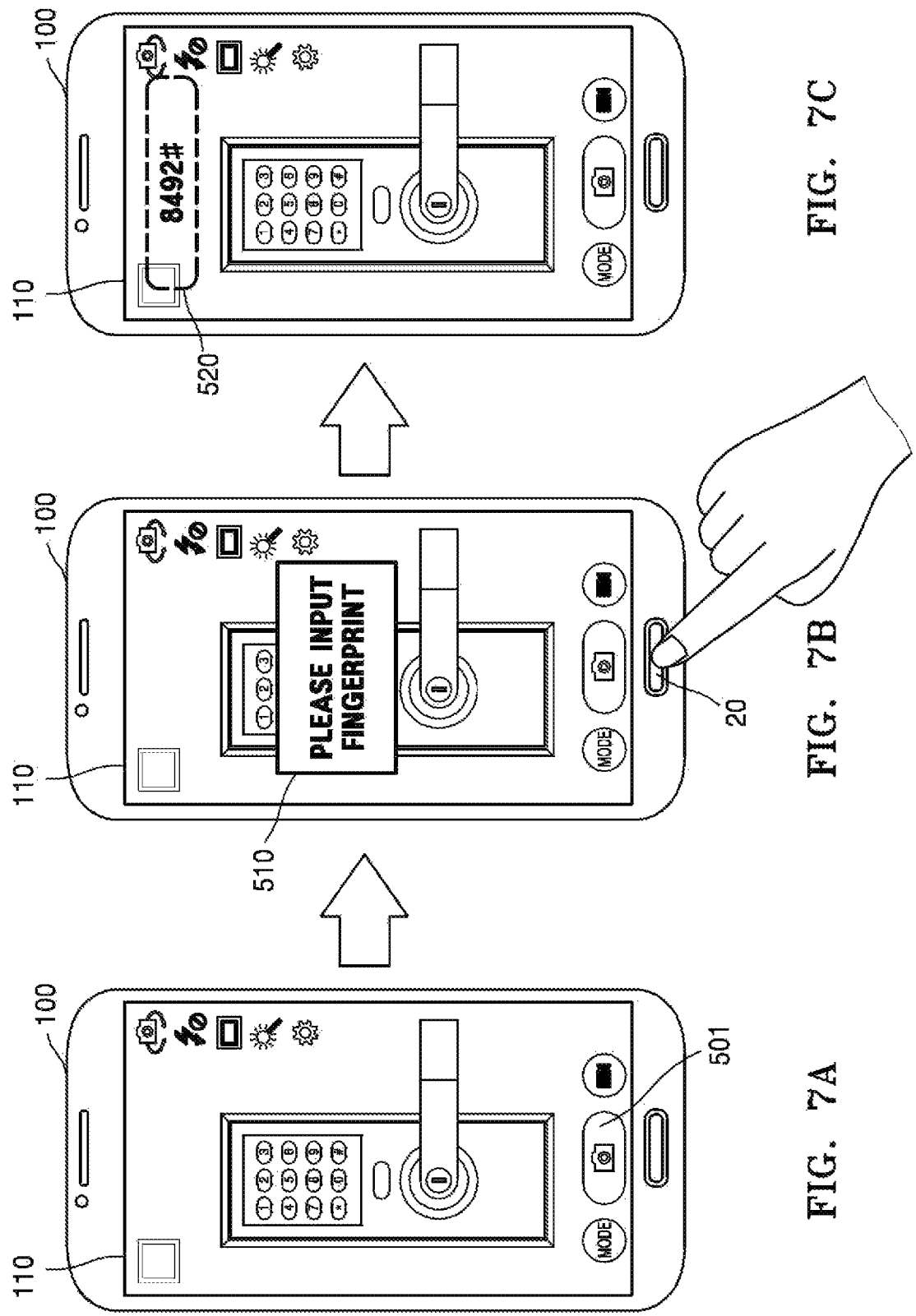
FIGS. 7A to 7C are diagrams showing an example in which an electronic device displays user information on a display according to an embodiment.

FIGS. 7A to 7C are diagrams showing an example in which an electronic device displays user information on a display according to an embodiment.

Referring to FIG. 7A, the electronic device 100 may photograph a door lock. For example, the electronic device 100 may execute a camera application. When the camera application is executed, the electronic device 100 may display a photographing screen on the display, and the photographing screen may include a photographing button 501. Here, a preview image may be displayed on the photographing screen. The preview image may be an image acquired to show an image of a subject to be photographed by the user.

When an input of pressing the photographing button is received, the electronic device 100 may photograph at least one object (e.g., a door lock) and may display an image obtained by photographing the object on the display 110.

The electronic device 100 may analyze the displayed image to acquire image information. For example, the electronic device 100 may recognize a door lock included in the displayed image to acquire image information "door lock."

When the image information is acquired, and biometric information and user information corresponding to the image information are stored in the electronic device 100 according to an embodiment, the electronic device 100 may display a message instructing to input biometric information on the display 110. In addition, according to the type of the biometric information corresponding to the acquired image information, the electronic device 100 may display a message instructing to input corresponding biometric information. For example, as shown in FIG. 7B, when the electronic device 100 acquires image information "door lock," and the biometric information corresponding to "door lock" is a fingerprint, the electronic device 100 may display a message 510 instructing to input the fingerprint. Alternatively, unlike FIG. 7B, the electronic device 100 may not display the message instructing to input the biometric information.

The electronic device 100 may sense the biometric information of the user. The biometric information may include, but is not limited to, at least one of a fingerprint, an iris, a voice, a vein, a face, a palmprint, electroencephalogram (EEG), electrocardiogram (ECG), and unique action information (e.g., a gesture, a gait, a posture, etc.) of the user.

For example, as shown in FIG. 7B, when the user touches the fingerprint recognition region 20 of the electronic device 100 with his/her finger, the electronic device 100 may recognize his/her fingerprint using a fingerprint recognition sensor. In FIG. 7B, the fingerprint recognition region 20 of the electronic device 100 is shown to be implemented as a region separate from the display 110. However, unlike this, when the display 110 is implemented as a touch screen, the fingerprint recognition region 20 may be implemented in the touch screen.

In addition, when a plurality of objects are displayed in an image displayed on the display 110, the user may touch any one of the plurality of objects to select an object from which the image information is to be acquired and input his/her fingerprint at the same time. When his/her fingerprint is sensed, the electronic device 100 may determine whether there is user information matching the acquired image information ("door lock") and the sensed fingerprint. When there is user information, the electronic device 100 may display the user information on the display 110.

For example, when information matching "door lock" and "fingerprint 1" is password information ("8492#") of the door lock, as shown in FIG. 7C, the electronic device 100 may display the password information ("8492#") 520 of the door lock on the display 110.

An example in which the user is authenticated using one piece of the biometric information and the user information is provided is shown in and described with reference to FIGS. 7A to 7C, but is not limited thereto. The electronic device 100 may authenticate the user using a plurality of pieces of biometric information and may provide the user information. For example, when the image information "door lock" is acquired, and the fingerprint information ("fingerprint 1") of the user and the iris information ("iris 1") of the user are sensed, the electronic device 100 may display password information of the door lock.

The user information according to an embodiment may also be matched to the plurality of pieces of biometric information. For example, the password information of the door lock may be stored, matching a fingerprint of a first user ("fingerprint 1") and a fingerprint of a second user ("fingerprint 2"). Even when the image information "door lock" is acquired, and the fingerprint information of the sensed user is not "fingerprint 1" but "fingerprint 2," the electronic device 100 may display the password information of the door lock. In addition, when a plurality of objects are included in the image, the electronic device 100 may receive an input of the user selecting a plurality of objects. The electronic device 100 may acquire image information (e.g., "door lock" and "air conditioner") regarding the plurality of selected objects. In addition, the electronic device 100 may sense the biometric information of the user (e.g., "fingerprint 1"). When the biometric information of the user is sensed, the electronic device 100 may provide user information corresponding to "door lock" and "fingerprint 1" and user information corresponding to "air conditioner" and "fingerprint 1."

Figure 8A:
FIGS. 8A and 8B are diagrams showing an example in which a message is displayed when there is no user information corresponding to image information acquired by an electronic device according to an embodiment.
Figure 8B:
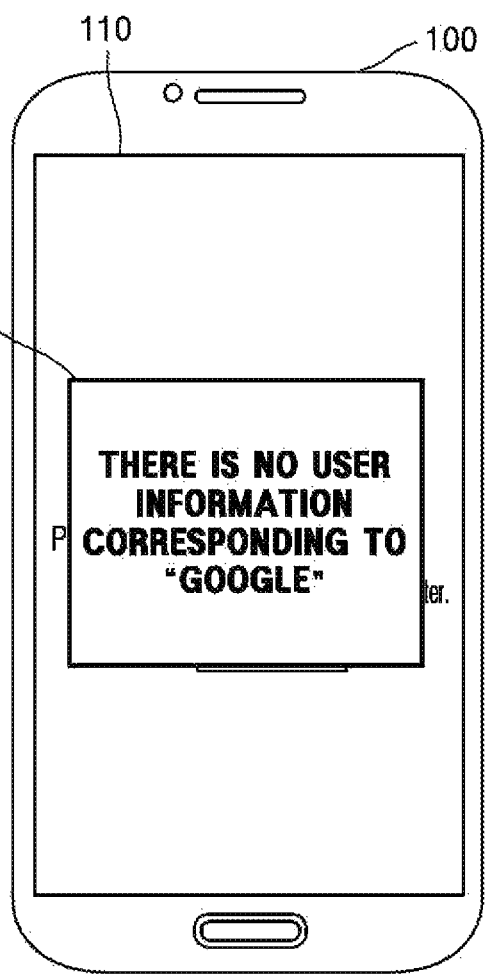

FIGS. 8A and 8B are diagrams showing an example in which a message is displayed when there is no user information corresponding to image information acquired by an electronic device according to an embodiment.

Referring to FIG. 8A, the electronic device 100 may execute a web application. When the web application is executed, the display 110 may display a web page screen 601. Here, the web page screen 601 may include a region for receiving a user ID, an email address, and a password.

Alternatively, the electronic device 100 may photograph a web page screen displayed on an external device and display the photographed web page, instead of directly executing the web application. Here, the external device may be a device that executes the web application.

As shown in FIG. 8A, when a Google web page screen is displayed on the display 110, the electronic device 100 may analyze an image of the Google web page screen to acquire image information "Google."

The electronic device 100 may determine whether the image information is acquired and whether biometric information and user information corresponding to the image information are stored. When the biometric information and user information corresponding to the acquired image information are not stored, the electronic device 100 may display a message indicating that there is no user information stored, as shown in FIG. 8B.

Alternatively, after acquiring the image information "Google," the electronic device 100 may sense biometric information of a user. When the user information is not stored, the electronic device 100 may display a message indicating that there is no user information stored, corresponding to the acquired image information and the sensed biometric information.

In addition, when there is no user information stored, the electronic device 100 may display a message for inquiring about whether to register the user information corresponding to the acquired image information and the sensed biometric information.

FIGS. 9A to 9C are diagrams showing an example in which an electronic device displays user information on a display according to an embodiment.

Referring to FIG. 9A, the electronic device 100 may display a web page screen 701 on a display 110. Here, the web page screen 701 may include a region for receiving a user ID, an email address, and a password.

The electronic device 100 may analyze an image for a Google web page screen to acquire image information "Google."

The electronic device 100 may sense biometric information of a user. For example, as shown in FIG. 9B, when the user touches a fingerprint recognition region 20 with his/her finger, the electronic device 100 may recognize his/her fingerprint using a fingerprint recognition sensor. However, embodiments of the present disclosure are not limited thereto. The electronic device 100 may sense an iris, a voice, a vein, a face, a palmprint, electroencephalogram (EEG), or electrocardiogram (ECG) of the user in addition to the fingerprint.

When the biometric information of the user is sensed, the electronic device 100 may display user information matching the acquired image information ("Google") and the sensed biometric information of the user on the display 110.

For example, when information matching "Google" and "fingerprint 2" includes a user email address and a password of the Google web page, the electronic device 100 may display the user email address and password 720 on the display 110.

Alternatively, the electronic device 100 may perform control such that the user email address and the password are automatically input to an input window, which is included in a web page screen, for a user email address and a password.

FIG. 10A to 10C are diagrams showing an example in which an electronic device transmits user information to an external device according to an embodiment.

Referring to FIG. 10A, the electronic device 100 may photograph a door lock. A method of photographing an object has been described in detail with reference to FIG. 7A, and its detailed description will be omitted.

The electronic device 100 may recognize a door lock included in the photographed image to acquire image information "door lock." In addition, as shown in FIG. 10B, the electronic device 100 may sense biometric information of a user. The biometric information may include, but is not limited to, at least one of a fingerprint, an iris, a voice, a vein, a face, a palmprint, electroencephalogram (EEG), electrocardiogram (ECG), and unique action information (e.g., a gesture, a gait, a posture, etc.) of the user.

When the biometric information of the user is sensed, the electronic device 100 may transmit user information matching the acquired image information and the sensed biometric information of the user to the external device.

For example, as shown in FIG. 10C, the electronic device 100 may transmit user information (e.g., key information that unlocks the door lock) matching the sensed fingerprint information of the user and the image information "door lock" to the door lock through short-range wireless communication (e.g., NFC, RFID, and BLE).

The door lock 820 determines whether the received key information is the same as unlock information. When the received key information is the same as unlock information, the door lock 820 may be unlocked.

Figures 11A, 11B, 11C:
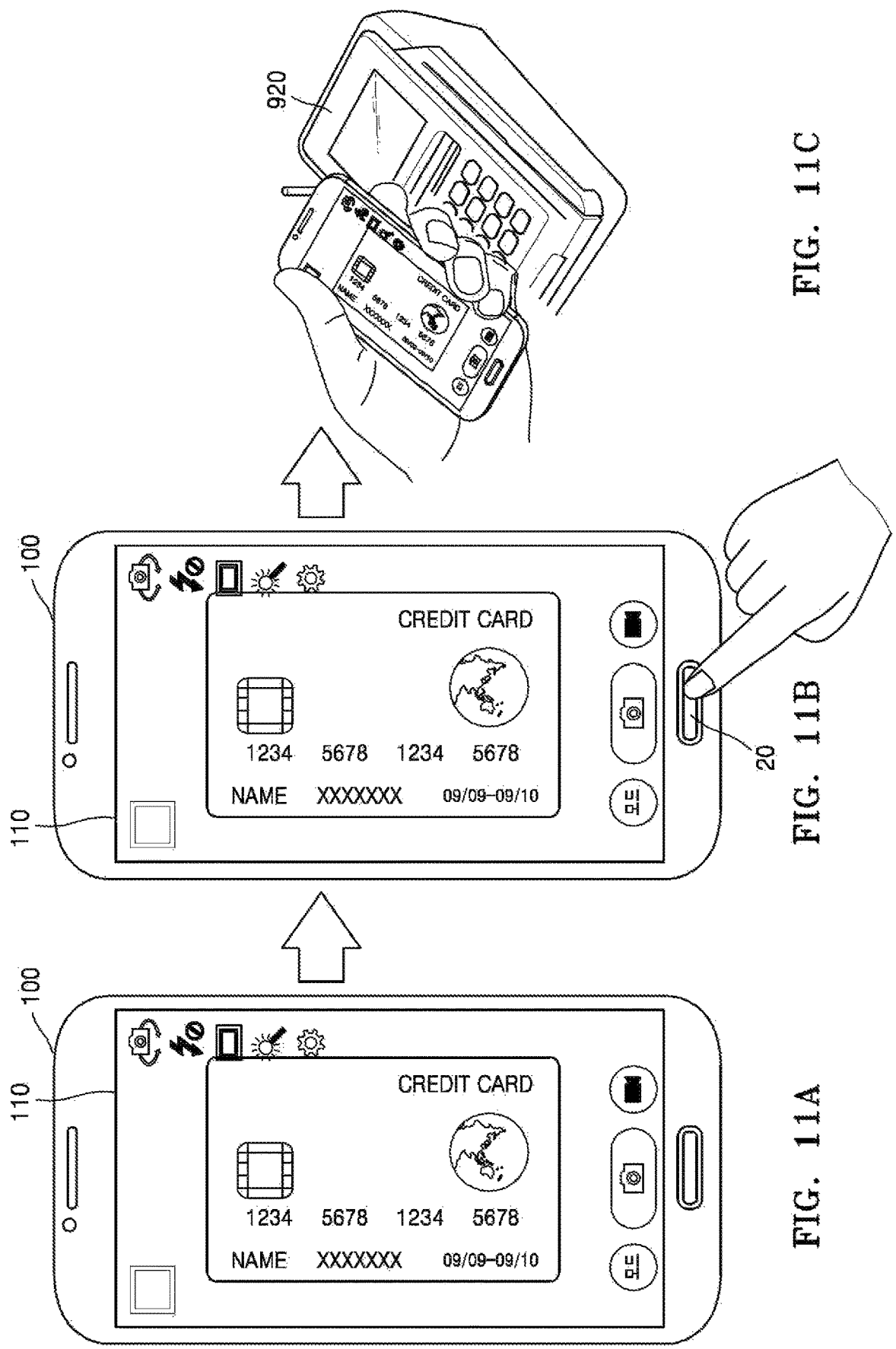
FIGS. 11A to 11C are diagrams showing an example in which an electronic device transmits user information to an external device according to an embodiment.

FIGS. 11A to 11C are diagrams showing an example in which an electronic device transmits user information to an external device according to an embodiment.

Referring to FIG. 11A, the electronic device 100 may photograph a credit card and may display a photographed image (i.e., a credit card image) on the display 110. A method of photographing an object has been described in detail with reference to FIG. 7A, and its detailed description will be omitted.

In addition, the electronic device 100 may display a credit card image stored in a storage on the display 110 or may display a credit card image received from an external device on the display 110.

The electronic device 100 may recognize a credit card included in the image displayed on the display 110 to acquire image information. In addition, as shown in FIG. 11B, the electronic device 100 may sense biometric information of a user. The biometric information may include, but is not limited to, at least one of a fingerprint, an iris, a voice, a vein, a face, a palmprint, electroencephalogram (EEG), electrocardiogram (ECG), and unique action information (e.g., a gesture, a gait, a posture, etc.) of the user.

When the biometric information of the user is sensed, the electronic device 100 may transmit user information matching the acquired image information and the sensed biometric information of the user to the external device. In this case, the electronic device 100 may additionally request that Personal Identification Number (PIN) and Card Verification Code (CVC) of the credit card should be input. Only when the input PIN and CVC are the same as the PIN and CVC of the recognized credit card, the electronic device 100 may transmit the user information matching the acquired image information and the sensed biometric information of the user to the external device.

For example, as shown in FIG. 11C, when the electronic device 100 transmits credit card information matching the sensed fingerprint information of the user and the image information "credit card" to a card terminal 920 through short-range wireless communication, the card terminal 920 may transmit the credit card information and a payment request to a payment server. Alternatively, the electronic device 100 may transmit the credit card information and the payment request to the payment server.

The payment server may determine whether the received credit card information is valid and may approve the payment request when the received credit card information is valid.

Figure 12:
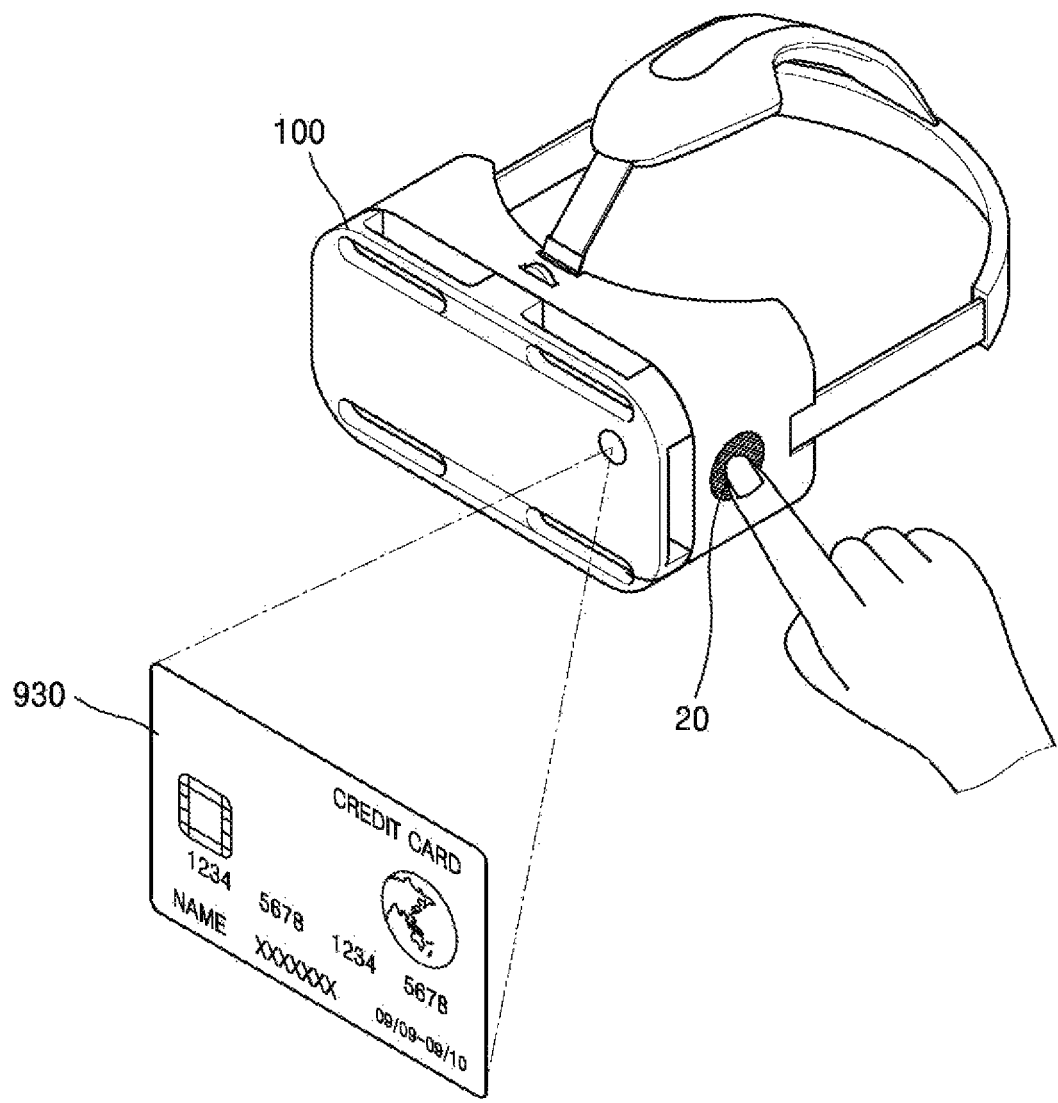
FIG. 12 is a diagram showing an example in which an electronic device transmits user information to an external device according to an embodiment.

FIG. 12 is a diagram showing an example in which an electronic device transmits user information to an external device according to an embodiment.

Referring to FIG. 12, an electronic device 100 according to an embodiment may be a head mount display. For example, the head mount display may be implemented in various forms of a virtual reality (VR) device that provides a VR image and an augmented reality (AR) device that provides an AR image. However, embodiments of the present disclosure are not limited thereto.

The head mount display 100 may photograph a credit card and may display an image obtained by photographing the credit card (i.e., a credit card image) on the display 110. For example, the head mount display 100 may photograph an external object (e.g., a credit card) according to a line-of-sight of a user who wears the head mount display 100.

The head mount display 100 may recognize a credit card included in the photographed image to acquire image information. In addition, the head mount display 100 may sense biometric information of a user. The biometric information may include, but is not limited to, at least one of a fingerprint, an iris, a voice, a vein, a face, a palmprint, electroencephalogram (EEG), electrocardiogram (ECG), and unique action information (e.g., a gesture, a gait, a posture, etc.) of the user.

When the biometric information of the user is sensed, the head mount display 100 may transmit credit card information matching the sensed fingerprint information of the user and the image information "credit card" and a payment request to the payment server. In addition, the payment server may determine whether the received credit card information is valid and may approve the payment request when the received credit card information is valid.

Figure 13C:
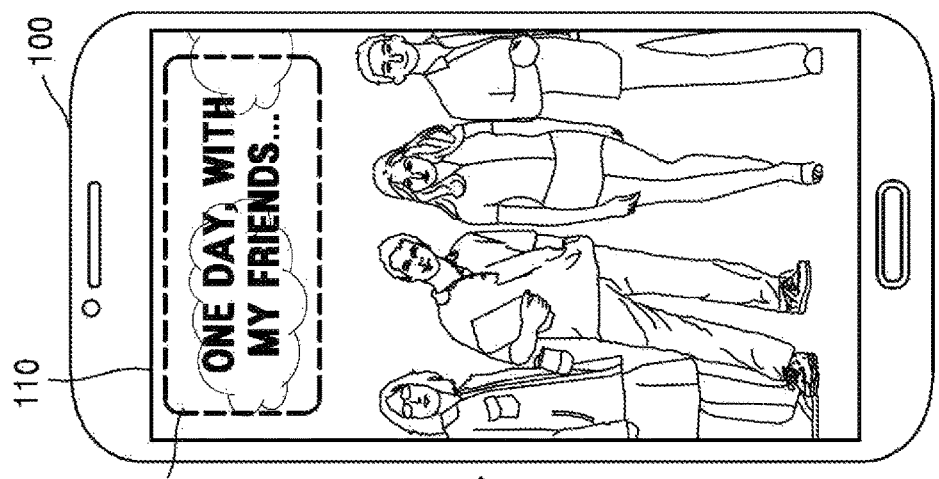
FIGS. 13A to 13C are diagrams showing an example in which an electronic device displays user information according to an embodiment.
Figure 13B:
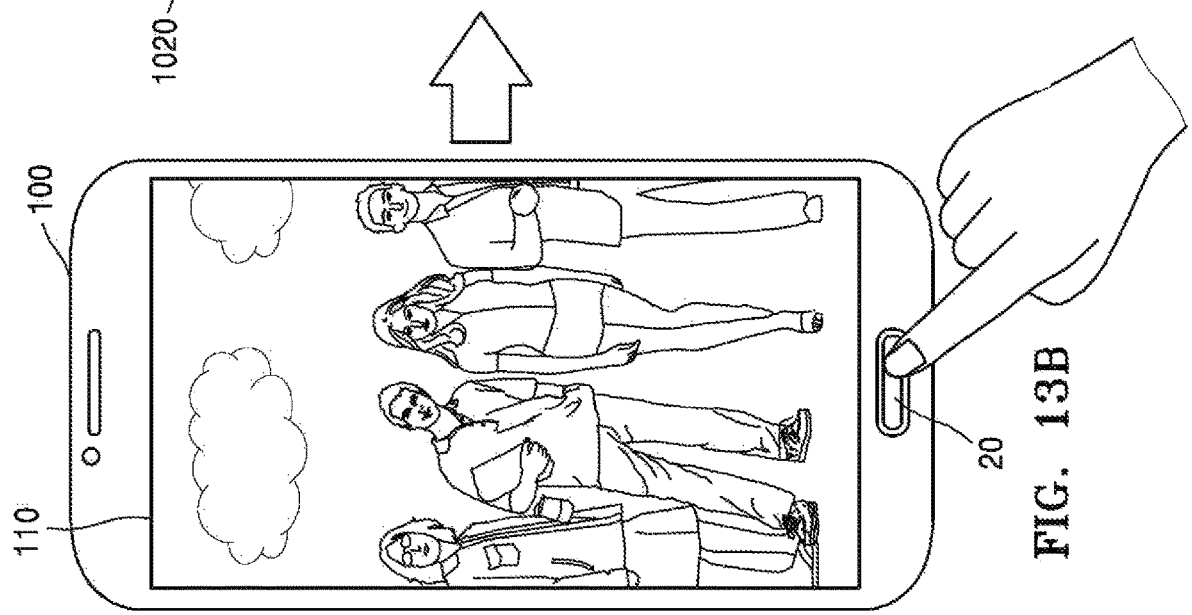
Figure 13A:
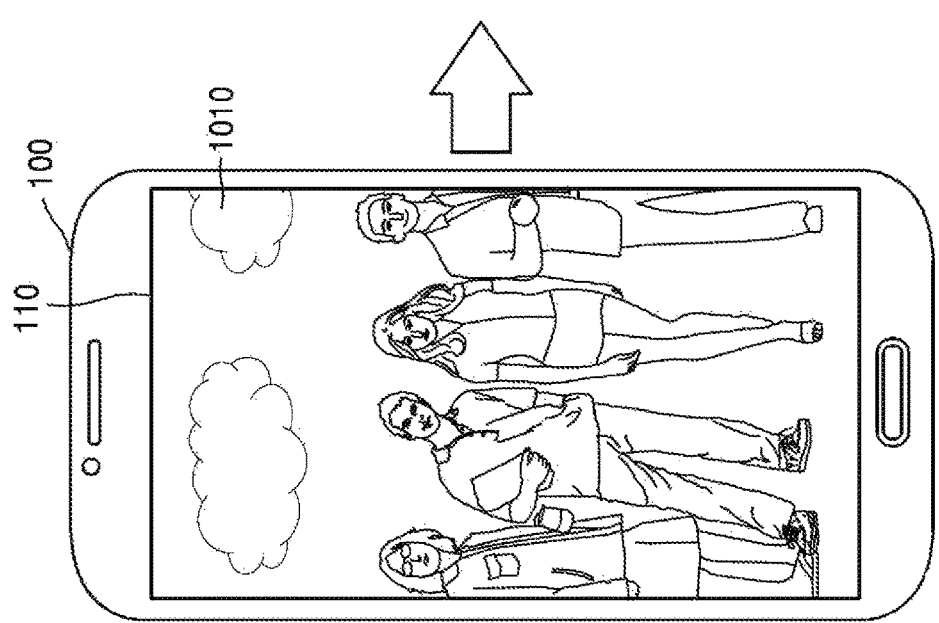

FIGS. 13A to 13C are diagrams showing an example in which an electronic device displays user information according to an embodiment.

When storing an image, the electronic device 100 according to an embodiment may store a secret memo (or diary) corresponding to the image in addition to biometric information of a user.

Referring to FIG. 13A, the electronic device 100 may execute a gallery application. When the gallery application is executed, the electronic device 100 may display at least one image stored in a storage. The electronic device 100 may receive an input of selecting any one from among the at least one image stored in the storage and may display the selected image 1010 on the display 110.

In addition, as shown in FIG. 13B, the electronic device 100 may sense biometric information of a user. The biometric information may include, but is not limited to, at least one of a fingerprint, an iris, a voice, a vein, a face, a palmprint, electroencephalogram (EEG), electrocardiogram (ECG), and unique action information (e.g., a gesture, a gait, a posture, etc.) of the user.

When the biometric information of the user is sensed, the electronic device 100 may determine whether the sensed biometric information of the user is the same as biometric information of a user stored corresponding to an image displayed on the display 110.

When the sensed biometric information is the same as the stored biometric information, the electronic device 100 may display a secret memo 1020 stored corresponding to the displayed image on the display 110.

Figures 14A, 14B, 14C:
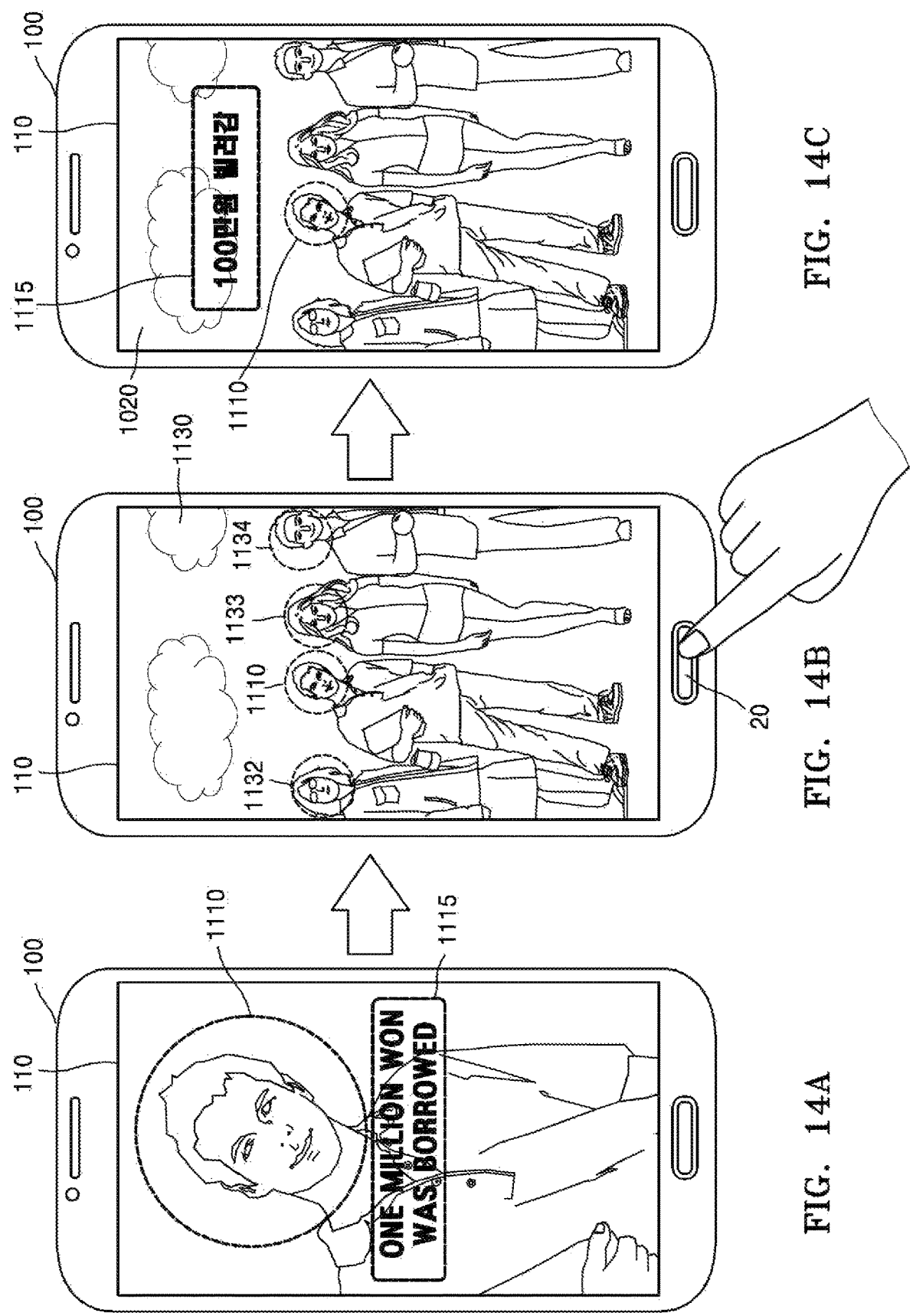
FIGS. 14A to 14C are diagrams showing an example in which an electronic device displays user information according to an embodiment.

FIGS. 14A to 14C are diagrams showing an example in which an electronic device displays user information according to an embodiment.

The electronic device 100 according to an embodiment may store a secret memo corresponding to a specific object together with biometric information of a user.

Referring to FIG. 14A, an electronic device 100 may display a first image including a first object 1110. In this case, a user may select the first object 1110 from the first image, and may input a secret memo 1115 for the selected first object 1110 and the user biometric information. The electronic device 100 may store the first object 1110, the received biometric information of the user, and the secret memo corresponding to one another.

In addition, when a plurality of objects are included in the image, the electronic device 100 according to an embodiment may select the plurality of objects and store biometric information and a secret memo corresponding to the plurality of objects.

Referring to FIG. 14B, the electronic device 100 may display a second image 1130 on the display. Here, the second image 1130 may include an image photographed by the electronic device 100 or a prestored image. The second image 1130 may also be an image received from an external device.

When the second image 1130 is displayed, the electronic device 100 may recognize a plurality of objects included in the second image 1130. For example, as shown in FIG. 14B, the electronic device 100 may recognize a first object 1110, a second object 1132, a third object 1133, and a fourth object 1134 included in the second image 1130. In this case, an object in which corresponding user information is stored among the recognized objects may be displayed separately from the other objects.

The electronic device 100 may sense biometric information of a user. The biometric information may include, but is not limited to, at least one of a fingerprint, an iris, a voice, a vein, a face, a palmprint, electroencephalogram (EEG), electrocardiogram (ECG), and unique action information (e.g., a gesture, a gait, a posture, etc.) of the user.

When the biometric information of the user is sensed, the electronic device 100 may display user information matching the recognized object and the sensed biometric information of the user on the display. For example, as shown in FIG. 14C, the electronic device 100 may display a secret memo 1115 corresponding to the sensed fingerprint information of the user and the recognized first object 1110 on display.

Figure 15C:
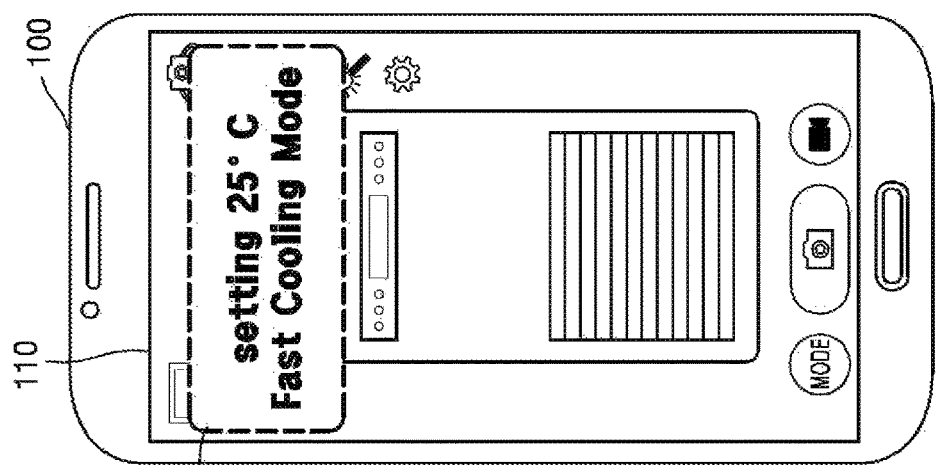
FIGS. 15A to 15C are diagrams showing an example in which an electronic device controls an external device using user information according to an embodiment.
Figure 15B:
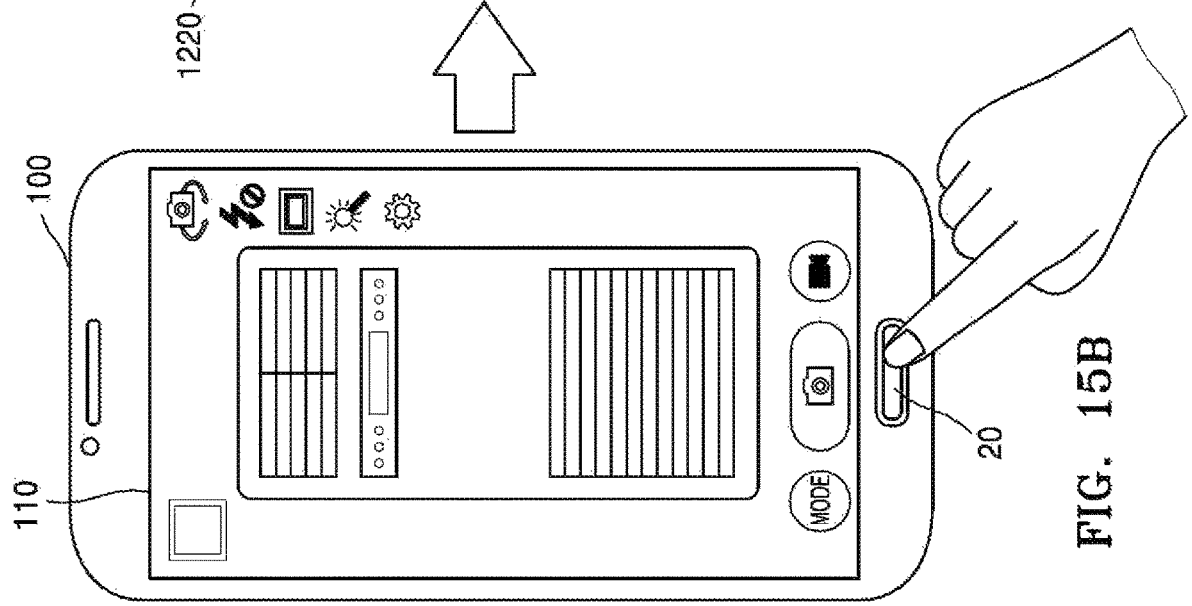
Figure 15A:
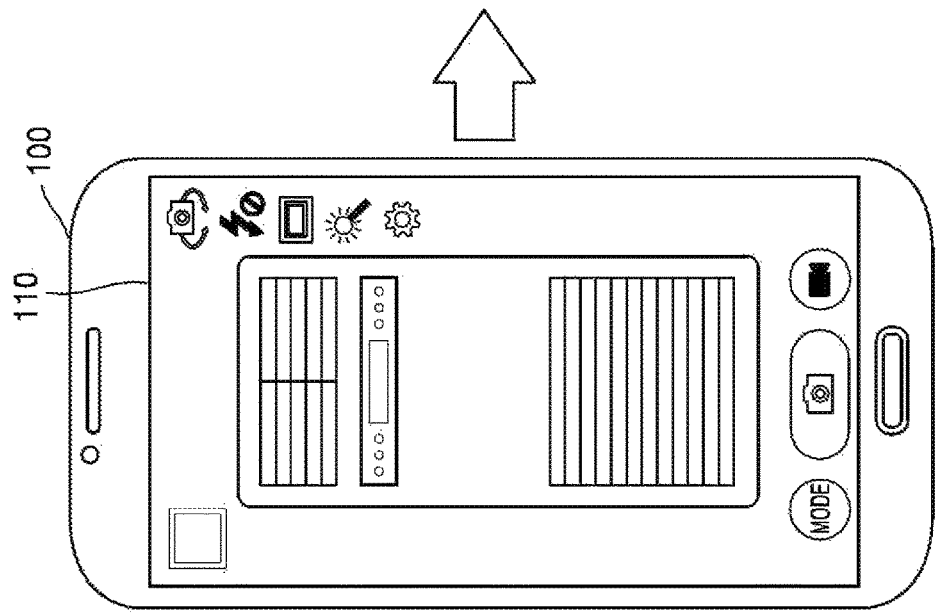

FIGS. 15A to 15C are diagrams showing an example in which an electronic device controls an external device using user information according to an embodiment.

Referring to FIG. 15A, an electronic device 100 according to an embodiment may photograph an external device to be controlled. For example, the electronic device 100 may photograph an air conditioner and may display an image obtained by photographing the air conditioner (i.e., an air conditioner image) on the display 110. A method of photographing an object has been described in detail with reference to FIG. 7A, and its detailed description will be omitted.

The electronic device 100 may recognize the air conditioner included in the image displayed on the display 110 to acquire image information. In addition, as shown in FIG. 15B, the electronic device 100 may sense biometric information of a user. The biometric information may include, but is not limited to, at least one of a fingerprint, an iris, a voice, a vein, a face, a palmprint, electroencephalogram (EEG), electrocardiogram (ECG), and unique action information (e.g., a gesture, a gait, a posture, etc.) of the user.

When the biometric information of the user is sensed, the electronic device 100 may control an external device using user information (e.g., external device settings information) matching the acquired image information and the sensed biometric information of the user.

For example, as shown in FIG. 15C, when air conditioner settings information 1220 matching "air conditioner" and the sensed fingerprint of the user is "set a desired temperature to 25° C. and operate in a power cooling mode," the electronic device 100 may set a desired temperature of the air conditioner to 24° C., and may transmit a control command for operating in the power cooling mode to the air conditioner.

Figure 16C:
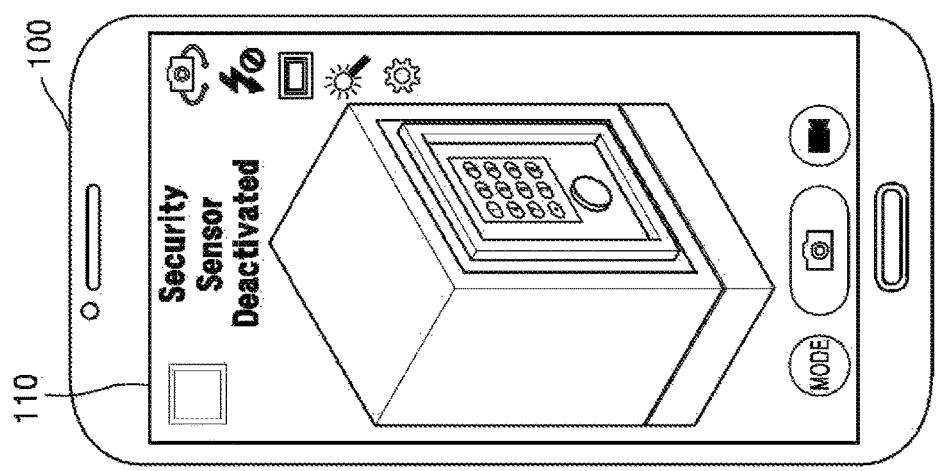
FIGS. 16A to 16C are diagrams showing an example in which an electronic device controls an external device using a user's settings information according to an embodiment.
Figure 16B:
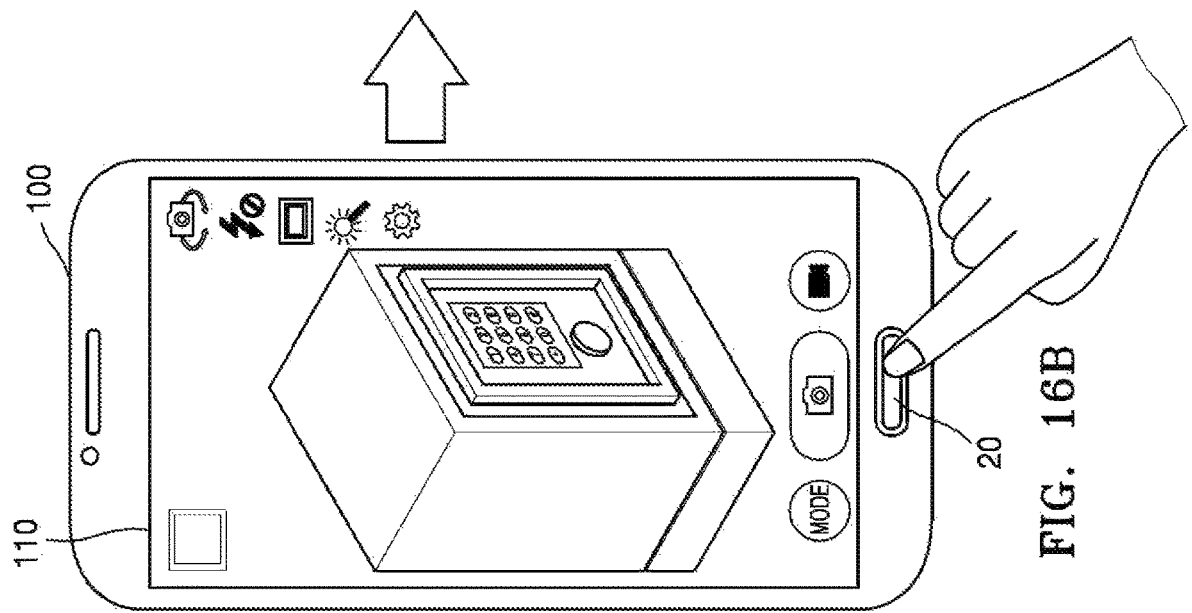
Figure 16A:
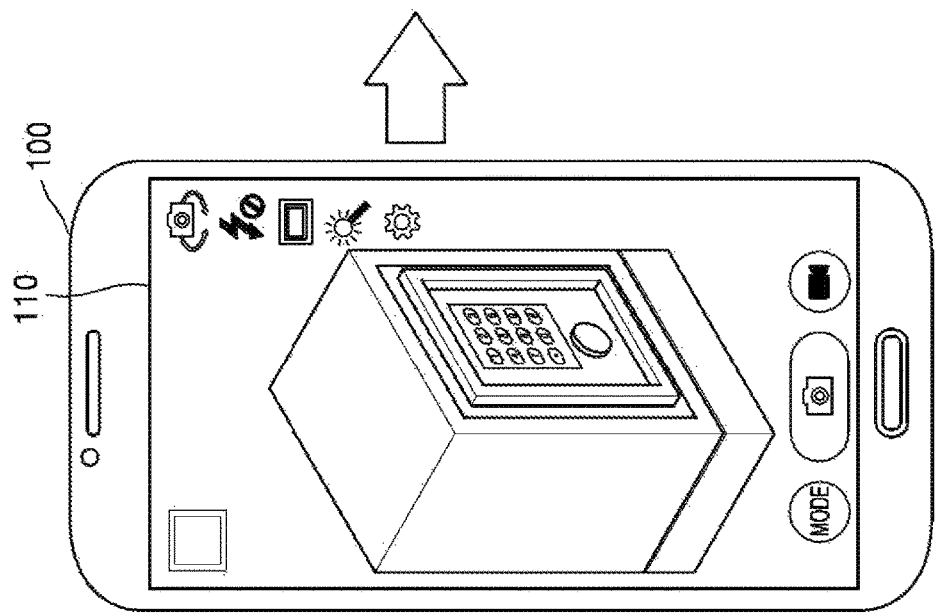

FIGS. 16A to 16C are diagrams showing an example in which an electronic device controls an external device using a user's settings information according to an embodiment.

Referring to FIG. 16A, an electronic device 100 according to an embodiment may photograph an external device to be controlled. For example, the electronic device 100 may photograph a strongbox and may display an image obtained by photographing the strongbox (i.e., a strongbox image) on the display 110.

The electronic device 100 may recognize the strongbox included in the image displayed on the display 110 to acquire image information. In addition, the electronic device 100 may sense biometric information of a user. The biometric information may include, but is not limited to, at least one of a fingerprint, an iris, a voice, a vein, a face, a palmprint, electroencephalogram (EEG), electrocardiogram (ECG), and unique action information (e.g., a gesture, a gait, a posture, etc.) of the user.

When the biometric information of the user is sensed, the electronic device 100 may control an external device using user information (e.g., external device control information) matching the acquired image information and the sensed biometric information of the user.

For example, when strongbox control information matching "strongbox" and the sensed fingerprint of the user is "deactivate security sensor of strongbox," the electronic device 100 according to an embodiment may transmit a control command for deactivating the security sensor of the strongbox to the strongbox.

FIGS. 17A to 17C are diagrams showing an example in which an electronic device controls an external device using a user's settings information according to an embodiment.

Referring to FIG. 17A, an electronic device 100 according to an embodiment may photograph an external device to be controlled. For example, the electronic device 100 may photograph a refrigerator and may display an image obtained by photographing the refrigerator (i.e., a refrigerator image) on the display 110.

The electronic device 100 may recognize the refrigerator included in the image displayed on the display 110 to acquire image information. In addition, as shown in FIG. 17B, the electronic device 100 may sense biometric information of a user. The biometric information may include, but is not limited to, at least one of a fingerprint, an iris, a voice, a vein, a face, a palmprint, electroencephalogram (EEG), electrocardiogram (ECG), and unique action information (e.g., a gesture, a gait, a posture, etc.) of the user.

When the biometric information of the user is sensed, the electronic device 100 may display user information (e.g., an external device control menu) matching the acquired image information and the sensed biometric information of the user on the display. For example, as shown in FIG. 17C, the electronic device 100 may display a refrigerator control panel screen 1420 matching "refrigerator" and the sensed fingerprint of the user on the display 110.

The user may set various functions, such as a temperature, of the refrigerator using a control menu included in the control panel screen 1420. The electronic device 100 may transmit a control command to the refrigerator on the basis of refrigerator settings information received from the user.

FIGS. 18A to 18C are diagrams showing an example in which an electronic device transmits user information to an external device or controls an external device using the user information according to an embodiment.

Referring to FIG. 18A, an electronic device 100 according to an embodiment may photograph an external device to be controlled. For example, the electronic device 100 may photograph a TV and may display an image obtained by photographing the TV (i.e., a TV image) on the display 110.

The electronic device 100 may recognize the TV included in the image displayed on the display 110 to acquire image information. In addition, as shown in FIG. 18B, the electronic device 100 may sense biometric information of a user. The biometric information may include, but is not limited to, at least one of a fingerprint, an iris, a voice, a vein, a face, a palmprint, electroencephalogram (EEG), electrocardiogram (ECG), and unique action information (e.g., a gesture, a gait, a posture, etc.) of the user.

When the biometric information of the user is sensed, the electronic device 100 may transmit user information corresponding to the acquired image information and the sensed biometric information of the user to the external device.

For example, the electronic device 100 according to an embodiment may store age information of the user corresponding to the biometric information of the user. In addition, when "TV" is recognized from the image, and the biometric information of the user is sensed, the electronic device 100 may transmit the age information of the user corresponding to the sensed biometric information to the TV 1520.

The TV 1520 may display recommended content on the basis of the age information of the user received from the electronic device 100. The TV 1520 may also provide limited content on the basis of the age information of the user.

For example, when the age of the user is 7, as shown in FIG. 18C, the TV 1520 may provide a program for children as the recommended content or may provide a channel for children as a recommended channel Alternatively, when the age of the user is 15, the TV may provide a program for teenagers as the recommended content or may provide an educational channel for teenagers as a recommended channel In addition, when the age of the user is not that of an adult, the TV 1520 may perform control such that mature content or an adult channel is not displayed.

Figure 19C:
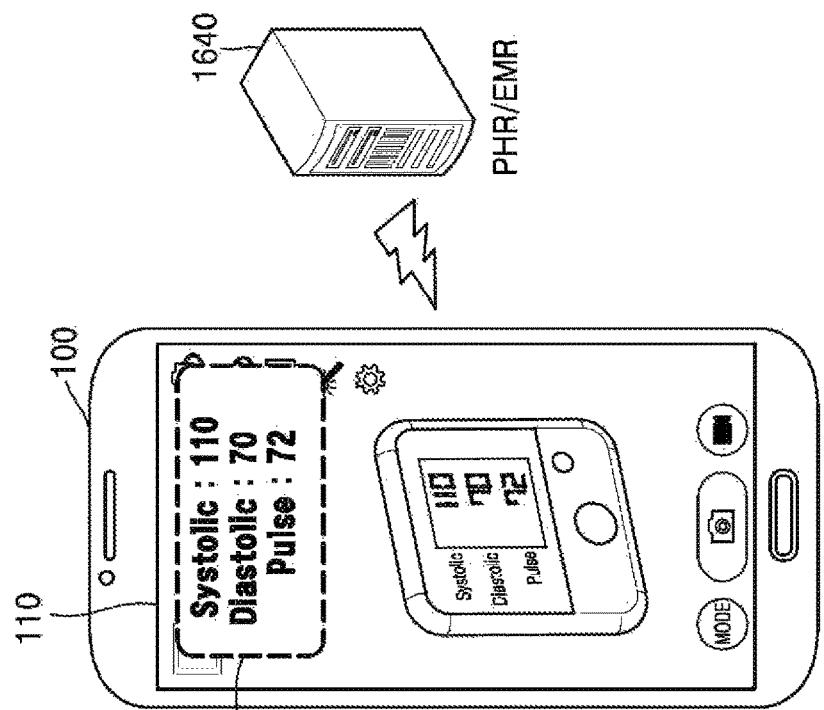
FIGS. 19A to 19C are diagrams showing an example in which an electronic device stores user information recognized from an image or transmits user information to an external device according to an embodiment.
Figure 19B:
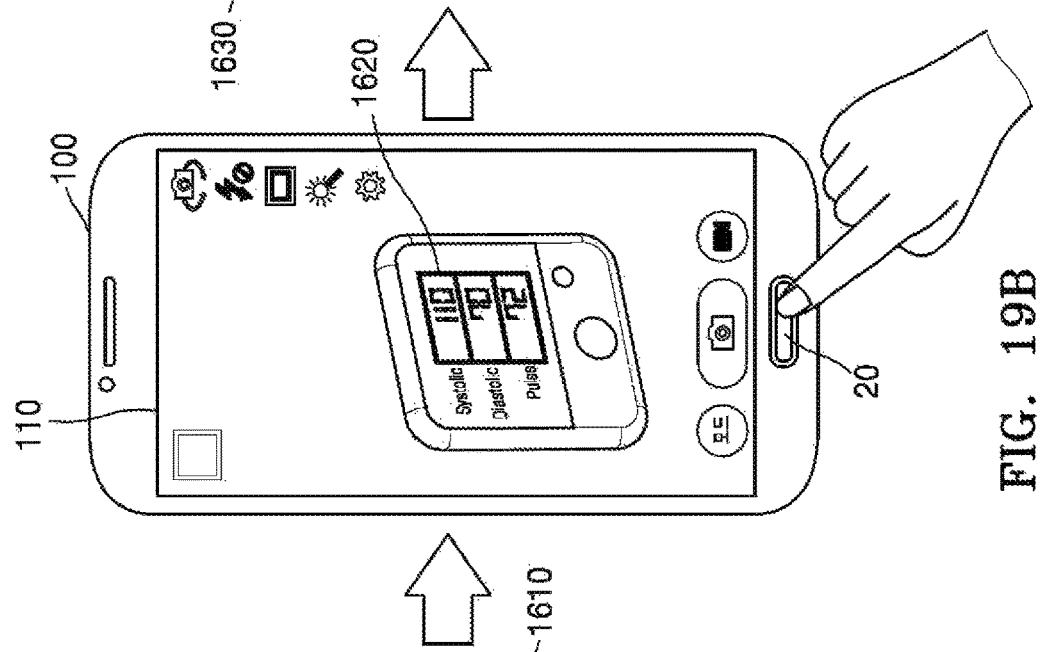
Figure 19A:
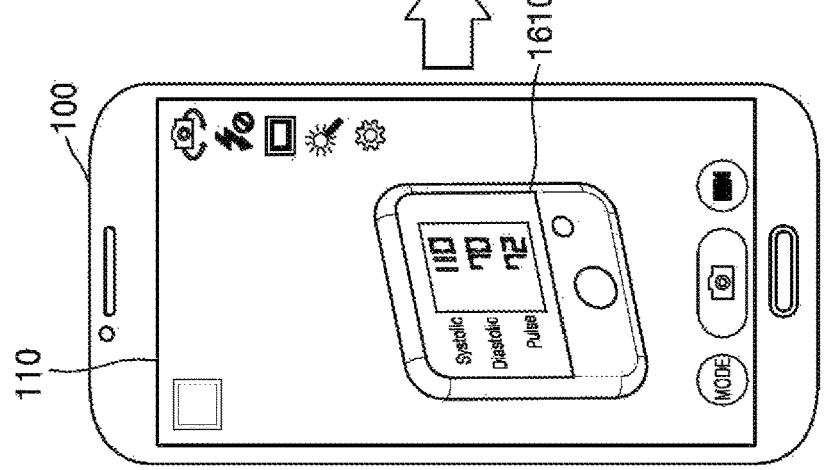

FIGS. 19A to 19C are diagrams showing an example in which an electronic device stores user information recognized from an image or transmits user information to an external device according to an embodiment.

Referring to FIG. 19A, an electronic device 100 according to an embodiment may photograph a medical apparatus. For example, the medical apparatus 1610 may include a blood pressure gauge, a glucose meter, etc. However, embodiments of the present disclosure are not limited thereto. For convenience of description, it will be assumed that the medical device is the blood pressure gauge.

When the user measures his/her blood pressure using the blood pressure gauge, the blood pressure gauge may display information 1620 about the measured blood pressure. The electronic device 100 may photograph the blood pressure gauge and may display an image obtained by photographing the blood pressure on the display 110. In this case, the measured blood pressure information 1620 of the user may be included in the photographed image. The electronic device 100 may acquire the blood pressure information 1620 of the user included in the photographed image using an object recognition method.

In addition, the electronic device 100 may sense biometric information of the user. The biometric information may include, but is not limited to, at least one of a fingerprint, an iris, a voice, a vein, a face, a palmprint, electroencephalogram (EEG), electrocardiogram (ECG), and unique action information (e.g., a gesture, a gait, a posture, etc.) of the user.

When the biometric information of the user is sensed, the electronic device 100 may display the acquired blood pressure information 1630 on the display 110 and may store the displayed blood pressure information as blood pressure information of the user corresponding to the sensed biometric information.

In addition, the electronic device 100 may transmit the blood pressure information of the user to an external server 1640. Here, the external server may be a personal health record (PHR) server that records personal health information or an electronic medical record (EMR) server that stores medical records of patients.

Figure 20:
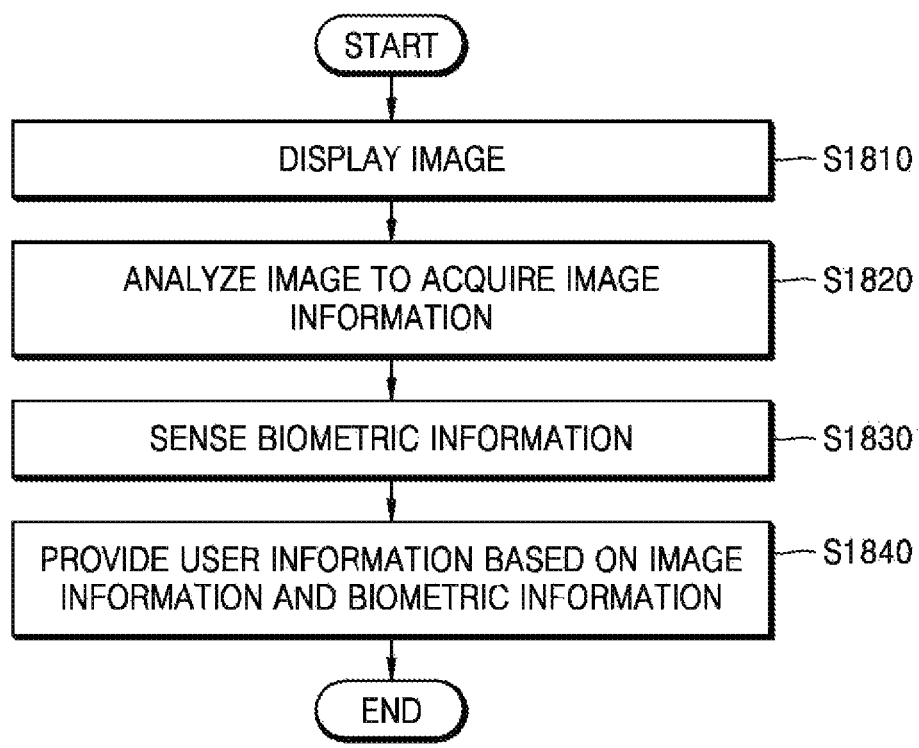
FIG. 20 is a flowchart showing an operating method of an electronic device according to an embodiment.

FIG. 20 is a flowchart showing an operating method of an electronic device according to an embodiment.

Referring to FIG. 20, an electronic device 100 may display an image (S1810).

The image may include an image photographed using the electronic device 100, an image previously stored in the electronic device 100, or an image received from an external device.

The electronic device 100 may analyze the image to acquire image information (S1820).

The electronic device 100 may recognize an object included in the image using an object recognition method. When the object is recognized, the electronic device 100 may acquire information about the recognized object as the image information. For example, when the electronic device 100 recognizes that the object included in the image is "door lock" using the object recognition method, the electronic device 100 may acquire image information "door lock."

The electronic device 100 may sense biometric information of a user (S1830).

The electronic device 100 according to an embodiment may include various sensors for sensing the biometric information of the user. For example, the electronic device 100 according to an embodiment may include a fingerprint recognition sensor, an iris recognition sensor, a voice recognition sensor, a vein recognition sensor, a face recognition sensor, a palmprint recognition sensor, an EEG measurement sensor, an ECG measurement sensor, etc. However, embodiments of the present disclosure are not limited thereto. The electronic device 100 may use various sensors to sense the biometric information of the user.

For example, the electronic device 100 may include a fingerprint recognition region. When a user touches the fingerprint with his/her finger, the electronic device 100 may recognize the fingerprint of the user using the fingerprint recognition sensor. Furthermore, the electronic device 100 may recognize a fingerprint, an iris, a voice, a vein, a face, a palmprint, electroencephalogram (EEG), or electrocardiogram (ECG) of the user.

The electronic device 100 may provide user information on the basis of the acquired image information and the sensed biometric information (S1840).

For example, the electronic device 100 may perform control such that the user information matching the image information and the biometric information is displayed on the display 110 or may perform control such that the user information is transmitted to the external device. In addition, the electronic device 100 may control the external device using the user information. The user information according to an embodiment is information regarding the user, and may include information associated with the user's privacy, such as an identity (ID) of the user, a password (a door lock password, an account password, a login password, etc.) of the user, credit card information of the user, and a secret memo or secret diary written by the user, the user's settings information, device control information, etc. However, embodiments of the present disclosure are not limited thereto.

When the biometric information of the user is not sensed, the electronic device 100 according to an embodiment may provide information about an object recognized from the image. For example, the electronic device 100 may provide public information recognized from the image such as the name of a person, a model name of a thing, and a manufacturer's name, etc., other than private information.

The user information providing method of the electronic device according to an embodiment may be implemented as program instructions executable by a variety of computers and may be recorded on a computer-readable recording medium. The computer-readable recording medium may include any one or a combination of a program instruction, a data file, a data structure, etc. The program instruction recorded on the recording medium may be designed and configured specifically for the present disclosure or can be publicly known and available to those who are skilled in the field of computer software. Examples of the computer-readable recording medium include a magnetic medium, such as a hard disk, a floppy disk, and a magnetic tape, an optical medium, such as a CD-ROM, a DVD, etc., a magneto-optical medium such as a floptical disk, and a hardware device specially configured to store and perform program instructions, for example, a ROM, RAM, flash memory, etc. Examples of the program instructions include not only machine code generated by a compiler or the like but also high-level language codes that may be executed by a computer using an interpreter or the like.

Although the embodiments have been described in detail, the scope of the present disclosure is not limited thereto, and modifications and alterations made by those skilled in the art using the basic concept of the present disclosure defined in the following claims fall within the scope of the present disclosure.

The invention claimed is:
1. A method of providing user information in an electronic device, the method comprising:
   storing user information matched to image information and biometric information;
   displaying an image;
   acquiring image information by analyzing the image, the acquiring of the image information comprising recognizing at least one object included in the image to acquire recognized object information as the image information;
   requesting input of biometric information, the biometric information requested corresponding to the acquired image information;
   sensing biometric information;
   providing user information matched to the acquired image information and the sensed biometric information; and
   electronically performing an action on a remote device, the remote device displayed as the recognized object in the image.
2. The method of claim 1, wherein the sensing of the biometric information comprises sensing at least one of fingerprint information, iris information, voice information, vein information, face information, palmprint information, electroencephalogram (EEG) information, or electrocardiogram (ECG) information of a user.
3. The method of claim 1, wherein,
   the acquiring of the image information comprises:
      receiving a touch input for selecting a specific region from the image, and
      analyzing the selected specific region to acquire the image information, and
   the sensing of the biometric information comprises sensing user fingerprint information from the touch input.
4. The method of claim 1, wherein the user information includes at least one of a user ID, a user password, a secret memo, a secret diary, settings information, or control information.
5. The method of claim 1, wherein the providing of the user information comprises displaying the user information that matches the image information and the biometric information on the display.
6. The method of claim 1, wherein the at least one object comprises at least one of: a door lock, another electronic device, a web authentication page, a payment credential, and a home appliance.
7. The method of claim 1,
   wherein the remote device comprises a lock, and
   wherein electronically performing the action on the remote device comprises unlocking the lock using the user information.
8. The method of claim 7, wherein the user information comprises key information.

9. The method of claim 1,
   wherein the remote device comprises a home appliance, and
   wherein electronically performing the action on the remote device comprises adjusting a setting of the home appliance.
10. An electronic device comprising:
   a storage configured to store user information matched to image information and biometric information;
   a display configured to display an image;
   a sensor configured to sense biometric information of a user; and
   a processor configured to:
      analyze the image to acquire image information, the acquiring of the image information comprising recognizing at least one object included in the image to acquire recognized object information as the image information,
      provide user information based on the image information and the biometric information, and
      electronically perform an action on a remote device, the remote device displayed as the recognized object in the image.
11. The electronic device of claim 10, further comprising a camera configured to photograph at least one object to acquire the image.
12. The electronic device of claim 10, wherein,
   the biometric information includes at least one of fingerprint information, iris information, voice information, vein information, face information, palmprint information, electroencephalogram (EEG) information, or electrocardiogram (ECG) information of the user, and
   the sensor includes at least one of a fingerprint recognition sensor, an iris recognition sensor, a voice recognition sensor, a vein recognition sensor, a face recognition sensor, a palmprint recognition sensor, an EEG measurement sensor, or an ECG measurement sensor.
13. The electronic device of claim 10, wherein,
   the display comprises a touch screen and the sensor,
   the touch screen receives a touch input for selecting a specific region from the image,
   the sensor is further configured to sense user fingerprint information from the touch input, and
   the processor is further configured to analyze the selected specific region to acquire the image information.
14. The electronic device of claim 10, wherein the user information includes at least one of a user ID, a user password, a secret memo, a secret diary, settings information, or control information.
15. The electronic device of claim 10, wherein the processor is further configured to perform control such that the user information that matches the image information and the biometric information is displayed on the display.

* * * * *